(12) United States Patent  (10) Patent No.: US 12,221,740 B2
Seo et al.  (45) Date of Patent: Feb. 11, 2025

(54) LAUNDRY TREATING APPARATUS AND ONLINE SYSTEM COMPRISING SAME

(71) Applicant: LG Electronics Inc., Seoul (KR)

(72) Inventors: Minsoo Seo, Seoul (KR); Hyeonsik Lee, Seoul (KR); Taegyu Jang, Seoul (KR)

(73) Assignee: LG Electronics Inc., Seoul (KR)

( * ) Notice: Subject to any disclaimer, the term of this patent is extended or adjusted under 35 U.S.C. 154(b) by 103 days.

(21) Appl. No.: 17/427,474

(22) PCT Filed: Jan. 29, 2020

(86) PCT No.: PCT/KR2020/001340
§ 371 (c)(1),
(2) Date: Jul. 30, 2021

(87) PCT Pub. No.: WO2020/159219
PCT Pub. Date: Aug. 6, 2020

(65) Prior Publication Data
US 2022/0127772 A1   Apr. 28, 2022

(30) Foreign Application Priority Data
Feb. 1, 2019 (KR) .................. 10-2019-0013851

(51) Int. Cl.
*D06F 33/52* (2020.01)
*D06F 34/22* (2020.01)
*D06F 34/32* (2020.01)
*D06F 58/36* (2020.01)
*D06F 103/04* (2020.01)
(Continued)

(52) U.S. Cl.
CPC .............. *D06F 33/52* (2020.02); *D06F 34/22* (2020.02); *D06F 34/32* (2020.02); *D06F 58/36* (2020.02); *D06F 2103/04* (2020.02); *D06F 2103/18* (2020.02); *D06F 2103/24* (2020.02); *D06F 2103/46* (2020.02); *D06F 2105/02* (2020.02); *D06F 2105/10* (2020.02);
(Continued)

(58) Field of Classification Search
None
See application file for complete search history.

(56) References Cited

U.S. PATENT DOCUMENTS 5,241,845 A   9/1993  Ishibashi et al.
5,297,307 A   3/1994  Baek
(Continued)

FOREIGN PATENT DOCUMENTS

CN   103685451   3/2014
EP   2883990     6/2015
(Continued)

OTHER PUBLICATIONS

Extended European Search Report in European Appln. No. 20747724. 1, dated Oct. 4, 2022, 8 pages.
(Continued)

*Primary Examiner* — Spencer E. Bell
(74) *Attorney, Agent, or Firm* — Fish & Richardson P.C.

(57) ABSTRACT

The present invention relates to a clothing processing device which, when using artificial intelligence or an algorithm provided by artificial intelligence, can cause a user to visually recognize same, and an online system comprising same.

18 Claims, 16 Drawing Sheets

(51) Int. Cl.
*D06F 103/18* (2020.01)
*D06F 103/24* (2020.01)
*D06F 103/46* (2020.01)
*D06F 105/02* (2020.01)
*D06F 105/10* (2020.01)
*D06F 105/12* (2020.01)
*D06F 105/48* (2020.01)
*D06F 105/56* (2020.01)

(52) U.S. Cl.
CPC ...... *D06F 2105/12* (2020.02); *D06F 2105/48* (2020.02); *D06F 2105/56* (2020.02)

(56) References Cited

U.S. PATENT DOCUMENTS

| | | | | |
|---|---|---|---|---|
| 2011/0202303 | A1* | 8/2011 | Petronilho | D06F 34/18 702/141 |
| 2017/0175317 | A1* | 6/2017 | Kim | D06F 33/32 |
| 2018/0283723 | A1 | 10/2018 | Ock et al. | |
| 2021/0062385 | A1* | 3/2021 | Kim | D06F 58/34 |

FOREIGN PATENT DOCUMENTS

| | | |
|---|---|---|
| EP | 3396051 | 10/2018 |
| KR | 100133463 | 4/1998 |
| KR | 20130027924 | 3/2013 |
| KR | 101841248 | 3/2018 |
| KR | 20180112653 | 10/2018 |
| KR | 20180119486 | 11/2018 |
| KR | 20180126838 | 11/2018 |

OTHER PUBLICATIONS

Office Action in Korean Appln. No. 10-2021-7024169, dated Oct. 21, 2022, 11 pages (with English translation).

International Search Report and Written Opinion in International Appln. No. PCT/KR2020/001340, dated May 19, 2020, 6 pages (with English translation).

Chinese Office Action in CN Application No. 202080011923.0, dated Dec. 28, 2022, 17 pages (with English translation).

* cited by examiner (a)

(b)

(c)

(d)

(b)

(a)

(b)

(c)

(d)

(e)

LAUNDRY TREATING APPARATUS AND ONLINE SYSTEM COMPRISING SAME

CROSS-REFERENCE TO RELATED APPLICATIONS

This application is a National Stage application under 35 U.S.C. § 371 of International Application No. PCT/KR2020/001340, filed on Jan. 29, 2020, which claims the benefit of Korean Application No. 10-2019-0013851, filed on Feb. 1, 2019. The disclosures of the prior applications are incorporated by reference in their entirety.

TECHNICAL FIELD

The present disclosure relates to a laundry treating apparatus capable of providing a customized service to a user by utilizing artificial intelligence, and an online system including the same.

BACKGROUND

In general, the term "laundry treating apparatus" refers to an apparatus capable of performing washing and drying or either washing or drying of clothes and the like. Here, the laundry treating apparatus may perform only the washing or drying function, or both the washing function and the drying function. Recently, washing machines provided with a steam supply device to perform a refresh function of removing wrinkles, odors, static electricity, and the like from clothes have been used.

Conventional laundry treating apparatuses are divided into a front loading type and a top loading type according to a retrieval direction of clothes. A typical example of this horizontal type is a drum washing machine or a drum dryer.

The front load type laundry treating apparatus refers to a laundry treating apparatus that has an opening formed in the front and a rotary shaft of the drum parallel to the ground or inclined with respect to the ground at a constant angle. The top load type laundry treating apparatus has an opening formed at the top and a rotary shaft of the drum vertically with respect to the ground.

In the laundry treating apparatus, any course and option for performing a washing cycle of removing foreign substances from clothing or a drying cycle of removing moisture from clothing are pre-stored in a controller or the like. The user selects a course and option provided by the laundry treating apparatus to perform washing or drying.

The course constitutes a complete cycle of all cycles including a washing cycle of removing foreign substances from clothing, a rinsing operation of separating foreign substances and detergent from clothing, and a dehydration process of removing moisture from clothing. The option may mean the drum rotation speed (rpm), water temperature, water level, intensity and degree of steam supply, the number of times the washing cycle, the rinsing cycle and the dehydration cycle, and the like are performed may be adjusted to perform the above course.

The user may identify the types or details of the courses or options and execute a course or option suitable for the clothing. However, the user may not be familiar with the type or details of the course or option. In addition, when there are many types of the courses or options, the user may not clearly distinguish the differences between the courses or options. In addition, when the condition of the clothing treated by the laundry treating apparatus is not satisfactory, the user may not know how to change the setting of the course or option. Furthermore, when changing any one of the course or option settings, the user may not know how to appropriately change the other settings. As a result, the user may not fail to utilize the functions or effects provided by the laundry treating apparatus because the user does not know how to set or use the course or option appropriately.

To address this issue, a washing machine using artificial intelligence has been recently introduced (See Korean Patent Application Publication No. 10-2018-0119486). The artificial intelligence may be provided through big data collected by a producer who manufactured a laundry treating apparatus, and the laundry treating apparatus may recommend a customized course or option to the user among any courses or options using the algorithm provided by the artificial intelligence. Specifically, the laundry treating apparatus may determine a course or option change the setting of the course or option, or recommend the course or option through artificial intelligence. Thereby, the user may use the optimal course or option that the laundry treating apparatus may provide.

However, the laundry treating apparatus utilizing the conventional artificial intelligence may not always use the artificial intelligence. For example, when setting a reservation time, the artificial intelligence may not be required. However, when recommending a reservation time, the artificial intelligence may be required. Further, the artificial intelligence may not be required when inputting a course or option, but may be required when adjusting the course or option.

In addition, when artificial intelligence is available only when the washing machine and the server are communicatively connected, the function of the laundry treating apparatus may need to be provided without using artificial intelligence when communication is lost.

As a result, when the laundry treating apparatus is operating, the user may not know whether the laundry treating apparatus has utilized artificial intelligence. Thus, the user may misunderstand that the laundry treating apparatus has failed to utilize artificial intelligence although it has used artificial intelligence. In addition, the user may misunderstand that artificial intelligence has been used although it has not been used, and may mistakenly believe that artificial intelligence is ineffective. In any cases, the conventional laundry treating apparatus may fail to notify the user of whether or not artificial intelligence is used, thereby reducing the reliability of the product.

While the laundry treating apparatus provides a customized service by utilizing artificial intelligence, the user may want a function that does not reflect artificial intelligence to be performed. For example, the user may input a desired course or option, or directly input the setting of the course or option. In this case, the user may not trust that the laundry treating apparatus is operating according to the input the user has provided without the intervention of artificial intelligence.

SUMMARY

An object of the present disclosure is to provide a laundry treating apparatus allowing a user to intuitively recognize whether artificial intelligence is used, and an online system including the same.

Another object of the present disclosure is to provide a laundry treating apparatus capable of notifying a user that artificial intelligence is utilized when the artificial intelligence is being utilized, and an online system including the same.

Another object of the present disclosure is to provide a laundry treating apparatus capable of visually presenting a course or option for which artificial intelligence is utilized among courses or options, and an online system including the same.

Another object of the present disclosure is to provide a laundry treating apparatus equipped with a control panel capable of indicating the status of utilization of artificial intelligence to the outside.

Another object of the present disclosure is to provide a laundry treating apparatus capable of determining the setting of a course or option, recommending a course or option, or changing the setting of the course or option through artificial intelligence.

Another object of the present disclosure is to provide a laundry treating apparatus capable of notifying that artificial intelligence is not used when a user provides an input that avoids intervention of artificial intelligence.

The object of the present disclosure can be achieved by providing a laundry treating apparatus for carrying out any courses providing a method of performing at least one of a washing cycle of removing foreign substances from clothing or a drying cycle of removing moisture from the clothing, and any options providing conditions including an intensity and number of times of execution of the courses.

The laundry treating apparatus may include a controller configured to perform at least one of determining and executing a setting of a specific course or option, changing the setting of the specific course or option, or recommending the specific course or option among the any courses or options, using artificial intelligence or an execution algorithm provided by the artificial intelligence, and an indicator configured to indicate a state of the controller to an outside.

The indicator may be configured to indicate a status of use of the artificial intelligence or the execution algorithm by the controller to the outside.

The indicator may include a light emitter configured to indicate the status of use of the artificial intelligence or the execution algorithm to the outside. When the controller uses the artificial intelligence or the execution algorithm, the light emitter may be turned on.

The light emitter may be configured to flicker while the controller is using the artificial intelligence or the execution algorithm.

The light emitter may remain turned on when the controller completes use of the artificial intelligence or the execution algorithm.

The light emitter may remain turned on even when a state (error) causing the course or option determined through the artificial intelligence or the execution algorithm not to be performed any more occurs.

The laundry treating apparatus may further include an input unit configured to directly receive a command to carry out the course or option, wherein the light emitter may be configured to be turned off based on an input being provided through the input unit. When the controller uses the artificial intelligence or the execution algorithm, the light emitter may remain turned on regardless of whether a result from the artificial intelligence or the execution algorithm is reflected.

The laundry treating apparatus may further include a cabinet defining an exterior, a tub accommodated in the cabinet to store water, a drum rotatably arranged in the tub to accommodate the clothing, a driving part coupled to the tub to rotate the drum, and a water level sensor configured to detect a water level in the tub.

The controller may detect one or more of a value of current applied to the driving part, a value of revolutions per minute (RPM) of the drum, and a value of the water level sensor to determine details of the course or option through the artificial intelligence or the execution algorithm.

The controller may recognize a weight or material of the clothing through the artificial intelligence or the execution algorithm. The controller may determine one or more of RPM, a water level, a temperature, or an execution time for execution of the course or option suitable for the weight or material.

The controller may recognize a weight or material of the clothing through the artificial intelligence or the execution algorithm, and determine a dehydration condition for execution of the course or option.

The laundry treating apparatus may further include an input unit configured to receive a command to change the setting of the specific course or option among the any courses or options. When an input is provided through the input unit, the controller may determine an amount of change of the setting using the artificial intelligence or the execution algorithm.

The controller may determine the amount of change of the setting using the artificial intelligence or the execution algorithm according to one input through the input unit.

The indicator may be configured to indicate the amount of change of the setting.

The laundry treating apparatus may further include a recommendation requester configured to receive an input to receive a recommendation of one course or option among the any courses or options, wherein, when the input is received through the recommendation requester, the controller may calculate and determine a course or option to be recommended among the any courses or options according to the artificial intelligence or the execution algorithm, wherein the indicator may indicate the course or option determined to be recommended by the controller.

The laundry treating apparatus may further include a communication module configured to receive local area information or any user information provided by a server, wherein, when the local area information or the user information provided by the server is input through the communication module, the controller may output the recommended course or option by reflecting the local area information or the user information in the artificial intelligence or the execution algorithm.

The local area information may include one or more of weather information providing weather condition information including a status of raining and a rainfall probability in an area where the laundry treating apparatus is located, atmospheric information providing a temperature, humidity, and air pollution status of the area, earthquake information providing information on whether an earthquake has occurred in the area, water quality information providing a water quality in the area, or electricity rate information for each time zone in the area.

The controller may recommend the recommended option by adjusting at least one of a washing intensity, the number of times of rinsing, a dehydration intensity, apparatus washing, an operating time, a water temperature, or steam supply based on the local area information.

According to the present disclosure, a user may intuitively recognize whether artificial intelligence is used.

According to the present disclosure, the user may be notified that artificial intelligence is utilized when the artificial intelligence is utilized.

According to the present disclosure, a course or option for which artificial intelligence is utilized may be visually presented.

The present disclosure may provide a laundry treating apparatus equipped with a control panel capable of indicating the status of utilization of artificial intelligence to the outside.

According to the present disclosure, the setting of a course or option may be, a course or option may be recommended, or the course or option setting may be changed, through artificial intelligence.

According to the present disclosure, when a user provides an input that avoids intervention of artificial intelligence, the user may be notified that the artificial intelligence is not used.

DETAILED DESCRIPTION

Figure 1:
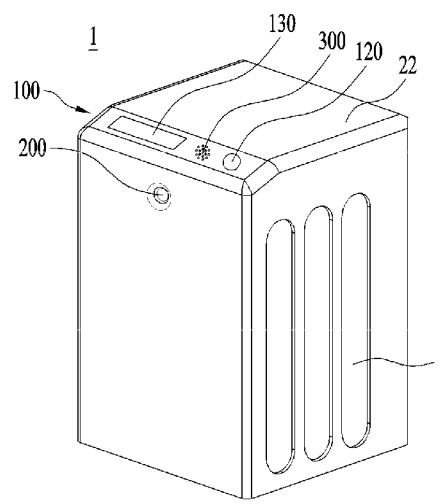
FIG. 1 shows types of a laundry treating apparatus according to the present disclosure.
Figure 1:
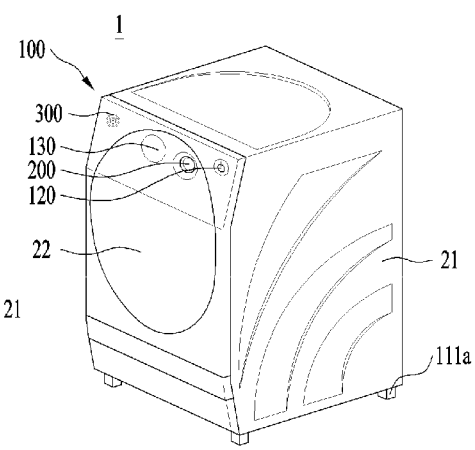
Figure 1:
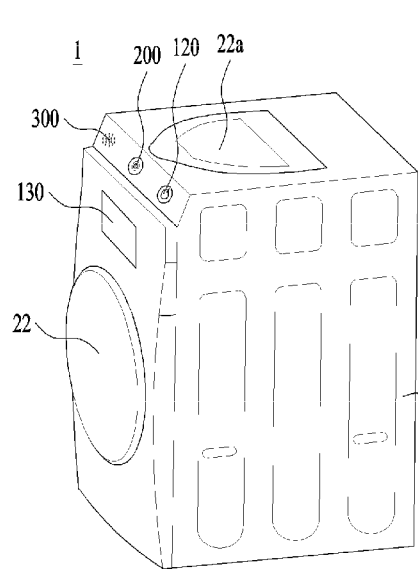
Figure 1:
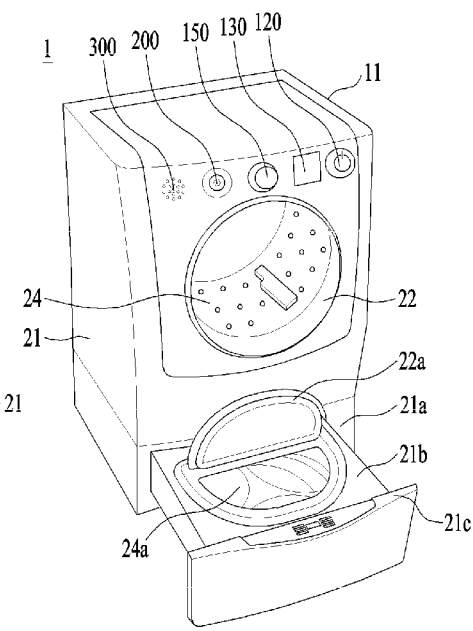

Hereinafter, exemplary embodiments will be described in detail with reference to the accompanying drawings. In the present specification, the same or similar reference numerals are assigned to the same or similar elements in different embodiments, and each of them will be described only once. As used herein, the singular forms "a", "an" and "the" include plural forms unless the context clearly indicates otherwise. In addition, in describing the embodiments disclosed herein, the detailed description of the related known technology may be omitted to avoid obscuring the subject matter of the embodiments. It should be noted that the accompanying drawings are merely provided to facilitate understanding of the embodiments disclosed in the present specification and are not to be construed as limiting the technical spirit disclosed in the present specification.

A laundry treating apparatus generally provides various courses and options for the user convenience. The course may be a concept including both a washing course used in a washing machine and a drying course used in a dryer.

Hereinafter, the course will be described based on the washing course applied to the washing machine, but this is merely for illustrative purposes. The course should be understood as a concept including the drying course used in the dryer.

The course is a series of driving including a washing cycle of removing foreign substances from clothing through the laundry treating apparatus, a rinsing cycle of separating foreign substances and a detergent from clothing, and a dehydration cycle of removing moisture from clothing. It may be a set algorithm or a control method for executing washing from the start to the end. Here, the course may include a drying cycle.

FIG. 1 shows several embodiments of the laundry treating apparatus of the present disclosure.

The laundry treating apparatus 1 of the present disclosure may include a cabinet 21 having an opening through which clothing are put in and defining an exterior, and a door 22 configured to open and close the opening.

Referring to FIG. 1-(a), the laundry treating apparatus 1 of the present disclosure may be a top load type laundry treating apparatus in which the opening and the door 22 are arranged at the top of the cabinet 21.

Referring to FIG. 1-(b), the laundry treating apparatus of the present disclosure may be a front load type laundry treating apparatus in which the opening and the door 22 are arranged in the front of the cabinet 21.

Referring to FIG. 1-(c) or 1-(d), the laundry treating apparatus 1 of the present disclosure may be configured by stacking a front load type laundry treating apparatus capable of performing washing and drying of clothing and a top load type laundry treating apparatus. For example, in the laundry treating apparatus 1 of the present disclosure, the top load type laundry treating apparatus may be arranged on the front type laundry treating apparatus (see FIG. 1-(c)), or may be arranged under the front load type laundry treating apparatus (see FIG. 1(d)).

When the laundry treating apparatus 1 of the present disclosure is configured by stating multiple processing apparatuses as describe above, the cabinet 21 may be shared. In addition, the cabinet 21 may have multiple openings. In this case, doors 22 and 22a to open and close the multiple openings may be provided.

The laundry treating apparatus of the present disclosure may further include a control panel 100 configured to receive, indicate, or execute a series of operation commands. The operation command may be any course or option set to perform a washing cycle of removing foreign substances from clothing or a drying cycle of removing moisture from clothing.

The control panel 100 may be provided with a controller 110 configured to control all elements of the laundry treating apparatus to perform the arbitrary course or option.

Any course or option providing a series of control methods capable of performing at least one of the washing cycle of removing foreign substances from clothing and the drying cycle of drying clothing containing moisture may be pre-stored in the controller 110.

When the laundry treating apparatus 1 is a washing machine, the course may be composed of a combination of a washing step of removing foreign substances from clothing, a rinsing step of separating foreign substances or a detergent from the clothing, or a dehydration step of removing moisture from the clothing. In addition, when the laundry treating apparatus 1 is a dryer, the option may include a plurality of drying steps of removing moisture from clothing.

The option may include a series of control methods for changing additional conditions of the course when the course is executed. When the laundry treating apparatus 1 is a washing machine, the option may be a series of control methods for controlling at least one of the number of times of execution of the washing step, the rinsing step, or the dehydration step, the drum rotation speed in performing each step, the ratio of the time for which the drum rotates to a certain period of time (the operating rate), the opening time of a water supply valve or the amount of water (water level), the amount of electricity used, water temperature, whether to supply steam, or the duration of each step.

When the laundry treating apparatus 1 is a dryer, the option may be a series of control methods for controlling at least one of the number of times of execution of the drying step, the drum rotation speed in performing the drying step, the ratio of the time for which the drum rotates to a certain period of time (the operating rate), the amount of electricity used, whether to supply steam, or the duration of the drying step.

The control panel 100 may include an indicator 130 configured to indicate the state of the laundry treating apparatus 1, a power supplier 120 configured to supply power to the laundry treating apparatus 1, and an input unit 150 configured to receive a input command for driving the laundry treating apparatus.

The indicator 130 and the input unit 150 may be separately configured in the control panel 100. The indicator 130 may be configured as a liquid crystal display, and the input unit 150 may be configured as a separate button (see FIGS. 1-(a), 1-(c), and 1-(d)). The control panel 100 may be configured as a touch display such that the functions of the indicator 130 and the input unit 150 may be implemented together on one screen (see FIG. 1-(b)).

The laundry treating apparatus 1 of the present disclosure may further include a microphone 300 through which the laundry treating apparatus recognizes a voice of a user, and a camera 200 through which the laundry treating apparatus recognizes motion of the user.

The motion of the user may be recognized through the camera 220 to execute the course or option. The voice of the user may be recognized through the microphone 300 to execute the course or option.

Furthermore, when a little child happens to enter the cabinet 21, the child's action may be recognized through the microphone 300 and the camera 200, and the user may be notified of the action or the door 22 may be unlocked to prevent any accident.

The laundry treating apparatus 1 of the present disclosure may further include a speaker. Accordingly, the user may be allowed to recognize the state of the laundry treating apparatus 1 by a sound signal.

Figure 2:
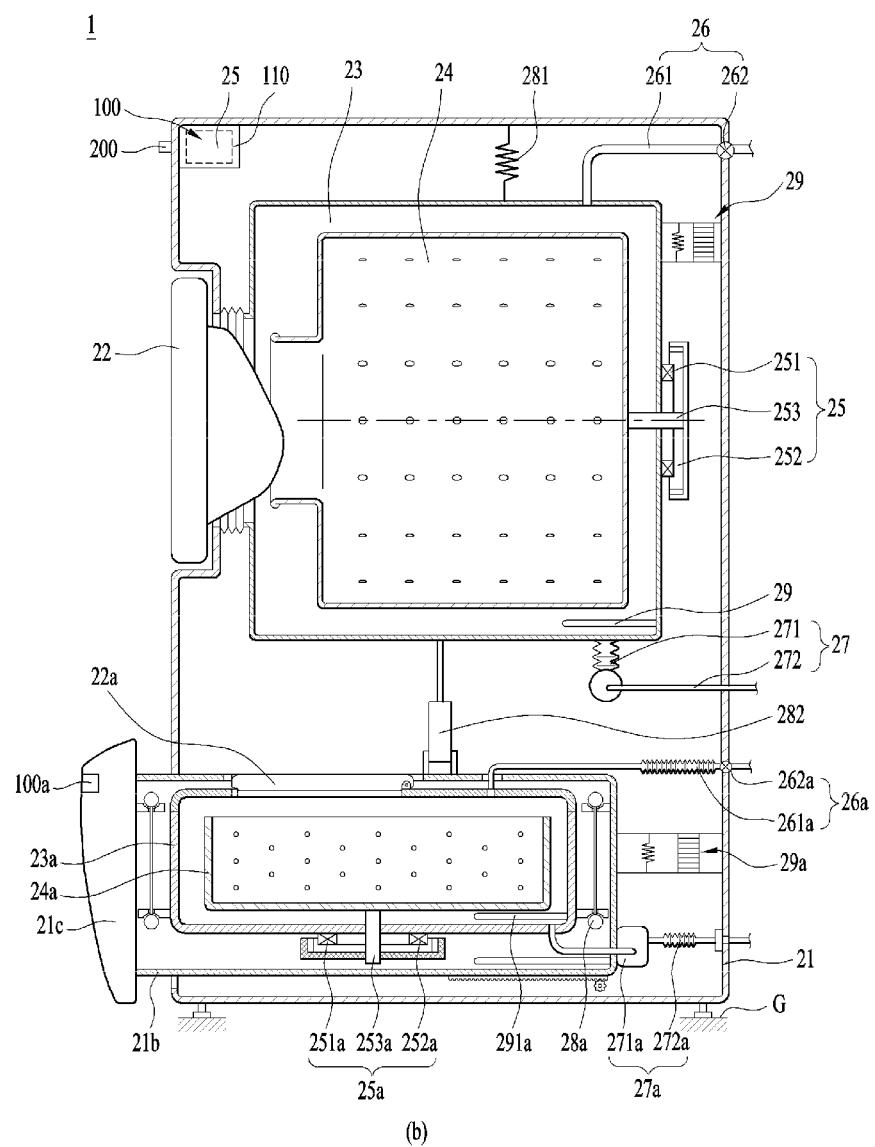
FIG. 2 shows the internal structure of the laundry treating apparatus according to the present disclosure.

FIG. 2 shows the internal structure of an embodiment of the laundry treating apparatus 1 of the present disclosure.

Specifically, FIG. 2 shows a detailed configuration of the laundry treating apparatus of FIG. 1-(d).

This is for illustration only. When the laundry treating apparatus of the present disclosure is configured as a front load type laundry treating apparatus, a top load type laundry treating apparatus, or a stacked structure of a front load type laundry treating apparatus and a top load type laundry treating apparatus, it may correspond to employing only a part of the basic structures or changing only the installation location in FIG. 2.

That is, FIG. 2 merely illustrates the structure of FIG. 1-(d) in order to avoid redundant description, and any structure may be employed as long as it is capable of performing the function of the laundry treating apparatus of the present disclosure.

Referring to FIG. 2, the laundry treating apparatus 1 according to the present disclosure may include a cabinet 21 defining an exterior and a clothing accommodation part arranged inside the cabinet to accommodate clothing.

When the laundry treating apparatus is configured as a washing machine, the clothing accommodation part may include a tub 23 arranged inside the cabinet 21 to store water, and a drum 24 rotatably arranged in the tub 23.

The laundry treating apparatus 1 of the present disclosure may also include a driving part 25 coupled to the tub 23 to rotate the drum 24, a water supplier 26 configured to supply water to the tub 23, and a drainage part 27 configured to drain water from the tub 23.

When the laundry treating apparatus 1 is configured as a dryer, the clothing accommodation part may include only the drum 24 rotatably arranged inside the cabinet 21.

The laundry treating apparatus 1 of the present disclosure may further include a hot air supplier or heater 29 configured to supply hot air to the tub 23, and may include a door 22 to open and close the inlet of the tub 23 and the opening of the cabinet 21.

The water supplier 26 may include a water supply valve 262 and a water supply pipe 261. The drainage part 27 may include a drain pump 271 and a drain pipe 272.

The driving part 25 may include a stator 251 coupled to the tub 23 to generate a rotating magnetic field, a rotor 252 rotated by the rotating magnetic field, and a shaft 253 configured to rotate together with the rotor 252 to rotate the drum 24.

The tub 23 may be supported on the cabinet 21 by a support part 28, which attenuates vibration of the tub. The support part 28 may include a damper 282 connecting the cabinet 21 and the tub 23 to attenuate vibration, and a spring 281.

When a laundry treating apparatus 20 of the present disclosure is configured as a complex laundry treating apparatus, it may include a second tub 23a arranged under or over the tub 23 to store water, a second drum 24a rotatably arranged inside the second tub 23, a second driving part 25a coupled to the second tub to rotate the second drum 24a, a second water supplier 26a configured to supply water to the second tub 23a, and a second drainage part 27a configured to drain water from the second tub 23a.

When the second tub 23a is arranged under the tub 23 and is configured as a top rod type, the second tub 23a may be accommodated in a drawer 21*b* arranged to be drawn out of and inserted into the cabinet 21.

The second water supplier 26*a* may include a second water supply valve 262*a* and a second water supply pipe 261*a*. The second drainage part 27*a* may include a second drain pump 271*a* and a second drain pipe 272*a*.

The second driving part 25*a* may include a second stator 251*a* coupled to the second tub 23*a* to generate a rotating magnetic field, a second rotor 252*a* rotated by the rotating magnetic field, and a second shaft 253*a* configured to rotate together with the second rotor 252*a* to rotate the second drum 24*a*.

The second tub 23*a* may be supported on the cabinet 21 by a second support part 28*a*, which attenuates vibration of the second tub.

The controller 110 of the control panel 100 may be configured to control all of the second water supplier 26*a*, the second drainage part 27*a*, and the second driving part 25*a*.

That is, the controller 110 may serve as an integrated controller to integrally control the laundry treating apparatus including the tub 23 and the laundry treating apparatus disposed on or under the tub 23.

For example, the driving parts 25 and 25*a*, the water suppliers 26 and 26*a*, the drainage parts 27 and 27*a*, and the hot air supplier 29 may repeat driving and stopping according to at least one of a course and an option set in the control panel 100 or the controller 110 of the laundry treating apparatus.

For example, according to the input course and option, the water supply valves 261 and 261*a* may be opened, the driving parts 25 and 25*a* may be rotated, and the drain pumps 271 and 271*a* may be operated. However, the control panel 100 may further include an auxiliary panel 100*a* separately provided to the drawer 21*b*, to independently control the second water supplier 26*a*, the second drainage part 27*a*, and the second driving part 25*a*.

The auxiliary panel 100*a* may include an additional controller provided independently of the control panel 100 so as to independently control the additional laundry treating apparatus arranged on or under the tub 23.

The laundry treating apparatus 1 of the present disclosure may further include a communication module 60 capable of communicating with at least one of a server 10 or an external terminal 40, which will be described later.

When the laundry treating apparatus 1 of the present disclosure is configured as a complex laundry treating apparatus, the control panel 100 may include a control panel configured to control the upper laundry treating apparatus and a second control panel configured to control the lower laundry treating apparatus. Alternatively, the laundry treating apparatus 1 of the present disclosure may be configured to control the entire complex laundry treating apparatus with one control panel 100.

Figure 3:
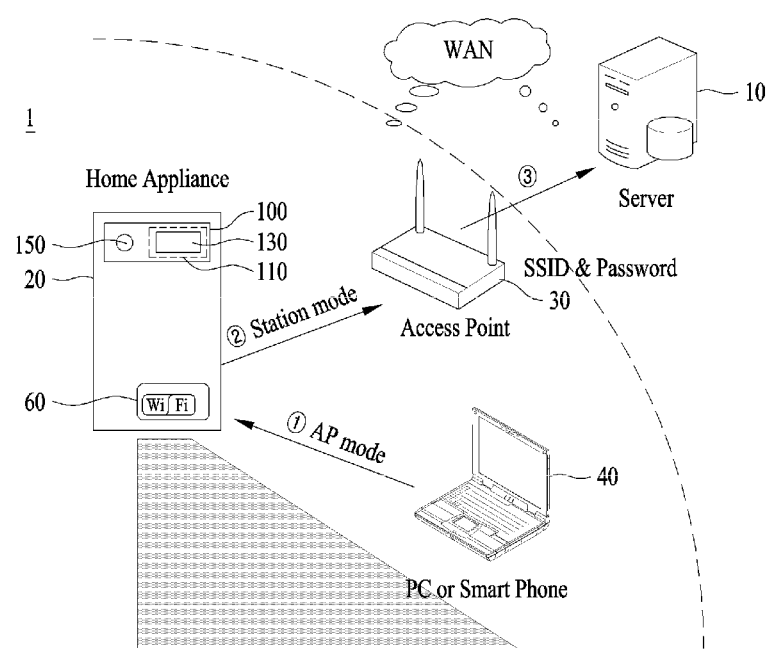
FIG. 3 shows an online system including the laundry treating apparatus of the present disclosure.

FIG. 3 shows an online system capable of controlling the laundry treating apparatus 1 of the present disclosure.

The figure illustrates an example in which a wireless Internet communication module is applied to the laundry treating apparatus 1 to communicate with the server 10 over the Internet through an access point (AP) 30.

The laundry treating apparatus 1 may be remotely controlled by the server 10 or an external terminal 40, or may communicate with the server 10 in order to update additional information. To this end, the apparatus is required to communicate with the AP 30 in the home. Accordingly, the laundry treating apparatus 1 may further include a communication module 60 capable of communicating directly with the AP. For example, the communication module 60 may be a Wi-Fi communication module.

For communicative connection of the laundry treating apparatus, the communication module 60 may be configured to support a setting mode for communicative connection and a use mode enabling communication.

The setting mode is a mode enabling communication with the AP. Therefore, it may also be referred to as an AP mode. The use mode is a mode allowing the laundry treating apparatus to communicate with the server via the AP to transmit/receive information for a remote management service at any time. That is, the use mode may be a standby mode for carrying out the remote service. Accordingly, the use mode may be referred to as a connection mode or a standby mode.

In other words, in order for the communication module 60 to establish a communicative connection, the module should initially execute the setting mode, and may switch to the use mode anytime thereafter.

An input means may be provided in the communication module 60 for the operation of the setting mode. However, in many cases, the communication module 60 may be embedded in the laundry treating apparatus 1 or provided in a simple form and mounted on the laundry treating apparatus 1. Accordingly, the input unit 150 of the laundry treating apparatus 1 may serve as the input means.

Once the communication module 60 is communicatively connected to the server 10 via the AP 30, the communication module 60 may remain turned on for continuous communication with the server 10.

From the perspective of the communication path from the laundry treating apparatus 1 as a starting point to the server 10, the part of the path after the AP is a public internet network, and the part of the path before the AP may correspond to a private internet network. The laundry treating apparatus 1 is assigned a private IP from the AP 30, and the AP 30 has a unique IP.

The server 10 also has an IP. The IP of the server may be a unique IP. Therefore, the communication module 60 of the laundry treating apparatus, for example, the Wi-Fi module, may pre-store the unique IP of the server. Accordingly, the communication module 60 of the laundry treating apparatus may be connected to the IP of the server through an activation procedure through an external terminal or the like to communicate with the server.

In this procedure, the AP 30 may send information indicating a port through which the laundry treating apparatus is connected and information indicating the IP thereof to the server 10, and the server 10 may determine the location of the laundry treating apparatus based on the information. When the laundry treating apparatus 1 transmits its own device ID to the server as well, the server may identify the laundry treating apparatus and the location thereof, and may access the laundry treating apparatus based on the this information. If there are a user ID and password input, this information may also be transmitted to the server 10.

Accordingly, the server 10 may match the specific laundry treating apparatus 1 of a specific user with a location. Accordingly, when a request for a specific service is made to the server through the laundry treating apparatus 1 or the external terminal 40 of the user, the server 10 may determine the specific laundry treating apparatus 1 and carry out the service.

The server 10 may establish communicative connection with the external terminal 40 through the unique IP thereof and the network. Optionally, the external terminal 40 may include a remote communication module for communication with the server 10, and an application APP.

The external terminal 40 may access the server 10 through the remote communication module using the application to remotely control the laundry treating apparatus 1. The user may receive state information about the laundry treating apparatus 1 from the server 10 through a display panel provided in the external terminal 40 as a touch panel or the like, and transmit a command for operating the laundry treating apparatus 1 to the server 10.

Figure 4:
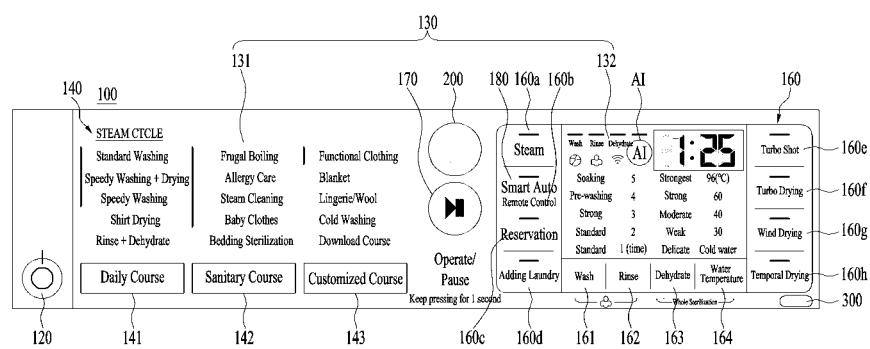
FIG. 4 shows a control panel for controlling the laundry treating apparatus of the present disclosure.

FIG. 4 shows an embodiment of the control panel 100 provided in the laundry treating apparatus 1 of the present disclosure.

Referring to FIG. 4, the indicator 130 may be provided as a display panel, and the input unit 150 may be provided as a separate physical button for input.

The input unit 150 may include a course input unit 140 configured to receive an input for selecting any one course from among courses for performing a series of clothing processes including washing, rinsing, and dehydration cycles of the laundry treating apparatus 1, and an option selector 160 configured to receive an input for selecting any one option among options for adjusting the intensity and degree of the course.

For example, when the laundry treating apparatus 1 is configured as a washing machine, the course may include a first course configured as washing method for removing foreign substances from general clothing or a set thereof, and a second course configured as a washing method for sterilizing the clothing or a set thereof, a third course configured as a washing method for removing foreign substances in consideration of the material of the clothing or a set thereof.

The option may include a first option for adjusting the intensity of washing in the selected course, a second option for adjusting the number of times of rinsing, a third option for adjusting the intensity of dehydration, and a fourth option for determining the water temperature in the tub accommodating clothing. Adjusting the washing intensity and the dehydration intensity may mean adjusting the rpm of the drum, the periodicity of change of the rotational direction of the drum, and the like in the washing cycle and the dehydration cycle.

The first course represents a general course for washing clothing, and may thus be referred to as a daily course. The second course represents a course for sterilization, and may thus be referred to as a sanitary course. The third course represents a course considering the material and weight of clothing, and may thus be referred to as a customized course.

The course selector 140 may be configured to select a course sequentially set or indicated through repetitive inputs.

The course selector 140 may include a first course selector 141 configured to select any one part of the first course, and a second course selector 142 configured to select any one part of the second course, and a third course selector 143 configured to select any one part of the third course.

Similar to the course selector 140, the option selector 160 may be configured to select a course sequentially set or indicated through repetitive inputs. The option selector 160 may include a first option selector 161 configured to adjust the washing intensity in the selected course, a second option selector 162 configured to adjust the number of times of rinsing, a third option selector 163 configured to adjust the dehydration intensity, and a fourth option selector 164 configured to determine the water temperature in the tub accommodating clothing and water. The option selector 160 may allow a desired option to be selected by sequential inputs provided through the respective option selectors.

The indicator 130 may be configured as a liquid crystal display, or may be configured as a light emitting light, a speaker emitting sound, or the like. The indicator 130 may include a first indicator 131 configured to indicate the course selected through the course input unit 140 and a second indicator 132 configured to indicate the option selected through the option selector 160.

The first indicator 131 may be configured to indicate the selected course. For example, a portion corresponding to the selected course may be lit, or the name of the course may be presented on the indicator.

The second indicator 132 may be configured to display the selected option. For example, a portion corresponding to the selected option may be lit, or the name of the option may be presented on the indicator.

Specifically, the first indicator 131 may be configured such that when the course adjuster 140 is input the corresponding course is turned on, and when an input is provided through the course adjuster 140, the corresponding course may be lit or displayed on the liquid crystal, or corresponding sound may be emitted. The first indicator 131 may be configured as a display panel, or may be configured as a lamp emitting light next to a text in which the details of the course is presented.

When the user clicks on the daily course 141, the general courses may be sequentially lit, such that the user may recognize the courses.

In addition, when the user clicks on the sanitary course, the courses corresponding to the sanitary course may be sequentially lit. When the user clicks on the customized course, the courses corresponding to the customized course may be sequentially lit.

When an input is provided through the option selector 160, the second indicator 132 may be configured to display the corresponding option on the liquid crystal display or emit corresponding sound. The second indicator 132 may be configured as a display panel or may be configured as a lamp to emit light next to the text in which details of the option are presented.

By repeatedly clicking on or touching the option selector 160, the first, second, third, and fourth options may be sequentially lit. Thereby, the user may select a desired option.

The option selector 160 may further include a switch or a touch area capable of performing additional functions other than the washing, rinsing, dehydration, and water temperature adjustment in the laundry treating apparatus 1.

The option selector 160 may further include a steam controller 160a configured to add an option of supplying steam to the inside of the laundry treating apparatus 20, a reservation part 160b configured to pre-determine the operating time of the laundry treating apparatus 20, an additional setting part 160d configured to perform clicking to add clothing during operation of the laundry treating apparatus 20, a turbo part 160e configured to add an option of instantaneously increasing the rpm of the drum of the laundry treating apparatus 20 to form a strong water current, a turbo drying part 160f configured to add an option of supplying strong hot air, a wind drying part 160g configured to add an option of supplying warm or cold air instead of hot air, and a temporal drying part 160h configured to add an option of performing natural drying by rotating only the drum at a constant speed.

The second indicator 132 may display the details of a course or an option when the course or option is determined.

However, in the processes other than the process of inputting a course or an option, for example, when the drying cycle or washing cycle is in progress, reservation setting is performed, or the drying cycle or washing cycle is finished, the second indicator may be configured as a display capable of displaying state information about the laundry treating apparatus 1.

The above-described structure is merely one embodiment, and the control panel 100 may be configured in any form as long as it includes an input unit 150 capable receiving a command for driving the laundry treating apparatus, and the indicator 130 configured to indicate the state of the laundry treating apparatus.

The laundry treating apparatus of the present disclosure may utilize artificial intelligence. The artificial intelligence may be an execution algorithm acquiring the big data stored in the server 10 by deep learning.

The laundry treating apparatus may be configured to carry out a course or option, change a setting of the course or option, or recommend a course or option, using artificial intelligence.

For example, the laundry treating apparatus may determine the aforementioned setting of the course or option through artificial intelligence. For example, when the third course is performed, the laundry treating apparatus may recognize the weight or material of clothing using the artificial intelligence, and may determine a course or option suitable for the clothing through the artificial intelligence. In addition, when the standard course is carried out in the first course, the weight and material of clothing may be recognized through the artificial intelligence, and the appropriate water temperature, water level, and dehydration intensity may be specifically set.

As such, the controller of the laundry treating apparatus may directly use the artificial intelligence or the execution algorithm extracted through the artificial intelligence, or may receive the execution algorithm through the server 10 and execute the execution algorithm.

The indicator 130 may be configured to indicate the status of use of the artificial intelligence or the execution algorithm in the controller to the outside.

Accordingly, the user may intuitively recognize whether the laundry treating apparatus can use artificial intelligence or whether the apparatus is using artificial intelligence. Accordingly, the user may trust the performance of the laundry treating apparatus. In addition, when the user does not want intervention of the artificial intelligence, the user may recognize whether the actual artificial intelligence is intervening.

Specifically, the indicator 130 may further include a light emitter AI capable of indicating whether the laundry treating apparatus utilizes artificial intelligence. The light emitter AI may be controlled to turn on when the laundry treating apparatus utilizes artificial intelligence or is using the artificial intelligence. As a result, the user may visually recognize whether the artificial intelligence is being executed.

The light emitter AI may be configured as one of the icons displayed on a liquid crystal display. The light emitter AI may be a separate LED disposed on the control panel 100. That is, the light emitter AI may be configured in any form as long it allows the user to visually recognize whether the artificial intelligence is being used.

The light emitter AI may be turned on when the course or option selected by the user utilizes artificial intelligence, and may be turned off when the course or option does not utilize artificial intelligence. Thus, the user may intuitively understand whether the course or option selected by the user utilizes the artificial intelligence.

Figure 5:
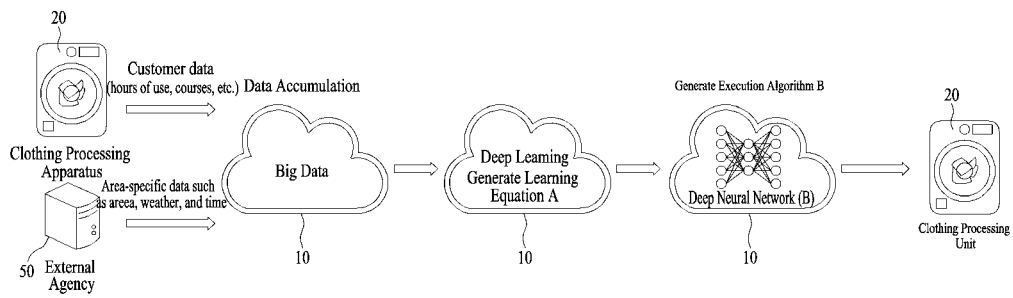
FIG. 5 is a block diagram illustrating the laundry treating apparatus of the present disclosure.

FIG. 5 illustrates how the online system including the laundry treating apparatus of the present disclosure acquires artificial intelligence.

The laundry treating apparatus 20 of the present disclosure shown in FIG. 5 may be provided by a seller or a producer. Accordingly, data including the usage history of the laundry treating apparatuses 20 provided by the seller or the producer, such as the details of courses and options in the courses used by users, may be collected by the server 10.

The server 10 may also collect data from an external agency 50. The data may include local area information corresponding to the respective laundry treating apparatuses 20 used by the respective users.

The server 10 may acquire big data by collecting and accumulating data provided by the laundry treating apparatuses 20 provided by the producer or seller and the external agency 50. In addition, the server 10 may be configured to perform deep learning. The server 10 may analyze the pattern of the data by performing deep learning using the big data through a learning equation A.

The learning equation A may be acquired the server 10 by machine learning of the big data. It may be an algorithm provided separately by the server 10 for the machine learning.

The learning equation A may be an algorithm configured to generate an execution algorithm B capable of driving the laundry treating apparatus in the future when the usage history and local area information are input.

The learning equation A may be regarded as a deep neural network (DNN) A, and the execution algorithm B may be an algorithm or an arithmetic expression that derives an expected result value when a specific state is input through the learning equation A with big data.

The execution algorithm B may be an algorithm acquired by the server managing a plurality of laundry treating apparatus including the aforementioned laundry treating apparatus by performing deep learning based on at least one of the usage histories of the specific user and any user and information indicating the local area where the laundry treating apparatus is located.

The learning equation A may generate an execution algorithm B by performing deep learning on the big data, and then train (update or develop) the execution algorithm B by continuously substituting the data input later into the execution algorithm B.

The execution algorithm B may be further developed by substituting the data, which has been collected from the laundry treating apparatus 20 and the external agency 50 to generate the execution algorithm B, into the learning equation A again.

In this way, the learning equation A may develop the execution algorithm B more precisely and with a high degree of completion over time. The controller of the laundry treating apparatus 20 may have the execution algorithm B that is pre-input thereto. Alternatively, the execution algorithm B may be provided in the server 10, and whenever there is a request for the algorithm, the laundry treating apparatus 20 may access the server 10 through the communication module 60 to directly receive the execution algorithm B stored in the server 10 or may access the learning equation A and the execution algorithm B to indirectly receive the result.

The execution algorithm B may be an algorithm that actually drives the laundry treating apparatus. For example, the execution algorithm may be a program that the controller of the laundry treating apparatus may execute.

The execution algorithm B may provide an actual method for carrying out a course or option. For example, it may provide an optimal method or setting for carrying out a specific course or option among other courses or options. The setting may be a specific algorithm that controls all elements of the laundry treating apparatus from the beginning to the end of a course or option.

The execution algorithm B may be an algorithm that automatically changes the remaining settings optimally when changing some of the preset settings of the course or option.

The execution algorithm B may be an algorithm capable of recommending a course or option suitable for a user among other courses or options.

In brief, the execution algorithm B may be an artificial intelligence program that optimally drives the laundry treating apparatus by performing machine learning on the big data.

The deep learning process of big data learning, reasoning, perception, and understanding may be understood as artificial intelligence. That is, when the learning equation A is regarded as artificial intelligence, the execution algorithm B may be a program acquired through the artificial intelligence.

Alternatively, the learning equation A and the execution algorithm B or a result therefrom may be understood as artificial intelligence. For example, when the execution algorithm B determines the optimal method for driving the laundry treating apparatus based on the information about the laundry treating apparatus or an input from the user, the execution algorithm may be understood as artificial intelligence.

Hereinafter, the artificial intelligence is defined as an algorithm for generating the learning equation A or the execution algorithm B, and the execution algorithm B is defined as an algorithm acquired through the artificial intelligence. Whether the artificial intelligence is executed or the execution algorithm B is executed may be indicated to the outside through the light emitter AI.

Figure 6:
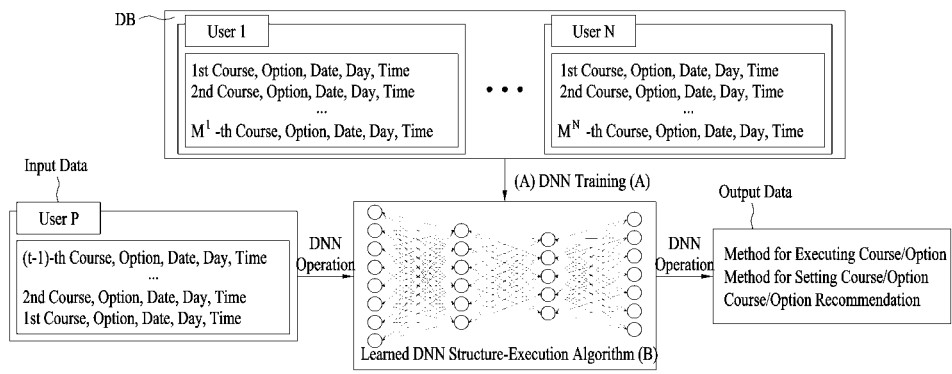
FIG. 6 shows an artificial intelligence or machine learning architecture of the online system of the present disclosure.

FIG. 6 illustrates in detail the generation of the execution algorithm B through the learning equation A based on the usage history of the laundry treating apparatus.

In the server 10, the courses and options carried out when the first laundry treating apparatus 20 provided by producer or seller is operated by user 1, the dates, days, and time zone when the first laundry treating apparatus 20 was operated, and the weather at the time when the apparatus was operated are stored as data.

When user 1 has operated the laundry treating apparatus 20 M times, the number of data may be M.

The courses and options carried out when the second laundry treating apparatus 20 provided by producer or seller is operated by user 2, the dates, days, and time zone when the second laundry treating apparatus 20 was operated, and the weather at the time when the apparatus was operated are also stored as data in the server 10. When user 2 has operated the laundry treating apparatus 20 M times, the number of data may be M.

The courses and options carried out when the N-th laundry treating apparatus 20 provided by producer or seller is operated by user N, the dates, days, and time zone when the N-th laundry treating apparatus 20 was operated, and the weather at the time when the apparatus was operated are also stored as data in the server 10. When user N has operated the laundry treating apparatus 20 M times, the number of data may be M.

Accordingly, M pieces of data used by each of N users may be collected by the server 10, and thus a total of N×M pieces of massive data may be collected.

As the number of the laundry treating apparatuses 20 increases or the number of times the laundry treating apparatus 20 is used increases, the volume of the data may become larger.

The server 10 may analyze the pattern or rule in the data by performing machine learning (deep learning) on the data through the learning equation A. It may output an execution algorithm B capable of determining an optimal execution method or optimal setting of a specific course or option among other courses or options, changing the settings of the course or option, or recommending the specific course or option through machine learning (Output data).

In other words, the server 10 may collect data including the type of a course used by a plurality of users in the laundry treating apparatus and the details of the options of the course, and generate the execution algorithm B by performing machine learning on the data.

The laundry treating apparatus 20 may include a communication module 60 capable of communicating with the AP 30, and may thus be configured to communicate with the server 10.

The execution algorithm B may include a weight matrix and a bias vector.

When a specific user P uses the (t−1)-th laundry treating apparatus, the usage history related to the specific user P may also be input to the execution algorithm B to perform learning.

Accordingly, when the specific user P uses the t-th laundry treating apparatus, the laundry treating apparatus 20 may determine an optimal course or option for the specific user P at the present time through the execution algorithm B.

When the laundry treating apparatus 20 is blocked from communicative connection with the server 10 and the external terminal 40, it may be fundamentally impossible to use the execution algorithm B. In addition, since it takes time for the laundry treating apparatus 20 to connect to the server 10 and the external terminal 40 and exchange data therewith, any course or option may not be recommended to the user for a long time even when the user provides an input through a recommendation requester 180.

When the server 10 completes the acquisition of the execution algorithm B by executing the learning equation A, collecting the usage history from every laundry treating apparatus 20 has a risk of causing overload to the server 10.

Accordingly, the laundry treating apparatus 20 needs to be configured to use the execution algorithm B by itself.

Figure 7:
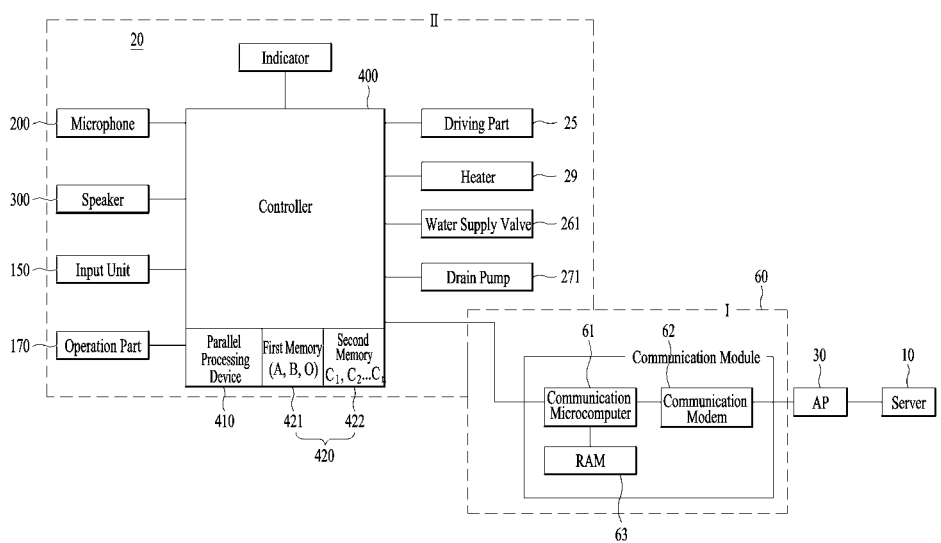
FIG. 7 shows a specific structure that enables the laundry treating apparatus of the present disclosure to execute artificial intelligence.

FIG. 7 is a block diagram showing the configuration of a laundry treating apparatus of the present disclosure.

A controller 400 of the laundry treating apparatus of the present disclosure may be provided in the control panel 100 or may be provided separately inside the cabinet 21. As shown in the figure, the controller 400 may be configured to control all components of the laundry treating apparatus 20 of the present disclosure.

The controller 400 may be configured to control the indicator 130, the input unit 150, an operation part 170, a microphone 200, a speaker 300, a communication module 60, the driving part 25, the water supply valve 261, the drain pump 271 and the heater 29.

The controller 400 may further include a storage unit 420 in which an operating system (OS) O for controlling the learning equation A, the execution algorithm B, and the laundry treating apparatus is separately stored, and a calculator 410 configured to calculate and determine a course and option to be recommended through the learning equation A and the execution algorithm B stored in the storage unit 420.

That is, the storage unit 420 may pre-store one or more of the learning equation A and the execution algorithm B generated by the server 10 during the production process or when it is connected to the server 10 for the first time. Only the learning equation A may be stored in the storage unit 420 such that the execution algorithm B may be acquired through the calculator 410, or only the execution algorithm B may be stored such that the calculator 410 may calculate and determine a customized course and option. Accordingly, the laundry treating apparatus 20 may be configured to recommend a course and option immediately when the recommendation requester 180 receives an input even when there is no assistance from the server 10 and the external terminal 40.

The storage unit 420 may be a non-volatile memory capable of storing the learning equation A, the execution algorithm B, and the operating system (OS) O, and maintaining a storage state even when power is not supplied. The storage unit 420 may have a large capacity to store the learning equation A, the execution algorithm B, and the OS O.

Accordingly, the storage unit 420 may include a first memory 421 configured as a large-capacity non-volatile memory. The large capacity may be greater than or equal to 1 GB and less than 1 TB.

The execution algorithm B may be configured to output a course and option to be carried out at the current time when the usage history C is input N times. In other words, the recommendation formula or the usage prediction formula B may be an algorithm capable of outputting a course and option to be carried out when the usage history of the course and option is input.

In this case, the execution algorithm B does not require input of the usage history to analyze the pattern of the usage history. The execution algorithm B is a usage prediction formula extracted from a vast usage history of a user through machine learning of the learning equation A. Accordingly, the execution algorithm B may be regarded as requiring a minimum input of usage histories to classify or select a suitable course and option from among a plurality of recommendation candidates.

That is, in order to output one high-accuracy course and option, the execution algorithm B may basically need N inputs of usage history or an input of N usage histories. Since the execution algorithm B does not simply analyze the pattern itself of the usage history, N may be about 1 to 10.

Accordingly, the storage unit 420 may store N or more usage histories C.

The usage histories C may be stored in the first memory 421, but the data volume thereof may not be large because only one to ten usage histories are stored.

The storage unit 420 may include a second memory 422 configured as a low-capacity non-volatile memory to store only the number of usage histories input to the execution algorithm B and remove other usage histories. The low capacity may be 1 GB or less.

The second memory 422 may be configured such that when N or more usage histories are stored, the usage histories are deleted in order in which they are stored. Accordingly, the second memory 422 may be configured in the form of an EEFROM that may be read or overwritten. The second memory 422 may initially have N pre-stored usage histories. The pre-stored usage histories may be details of courses and options arbitrarily input by a producer or a seller, or may be an actual usage history of a user in the server 10.

When the local area information provided by the server 10 and the scheduler of a specific user provided by the external terminal 40 are input through the communication module 60, the execution algorithm B stored in the storage unit 420 may output an appropriate course and option, considering the local area information and the scheduler.

The execution algorithm B may be configured such that not only the usage history of courses and options, but also information such as the local area information and the scheduler is input to be reflected in recommending a course and option.

For example, the local area information may include one or more of weather information providing whether condition information including a status of raining and a rainfall probability of the area where the laundry treating apparatus 20 is located, atmospheric information providing the temperature, humidity, and air pollution status of the area, earthquake information providing whether an earthquake has occurred in the area, water quality information providing the water quality in the area, or electricity rate information for each time zone in the area.

The calculator 410 may operate the execution algorithm B based on the local area information.

In addition, the calculator 410 may be configured to temporarily calculate a course and option in the execution algorithm B and then adjust the recommended option. For example, the calculator 410 may recommend an option by adjusting at least one of the washing intensity, the number of times of rinsing, the dehydration intensity, apparatus washing, the operation duration, the water temperature, or steam supply.

Specifically, the calculator 410 may input the usage history stored in the storage unit 420 to the execution algorithm B to calculate and output a customized course and option, may input the usage history to the learning equation A to re-acquire the execution algorithm B, or may input the local area information from the communication module 60 to the execution algorithm B to perform calculation.

When the calculator 410 re-acquires the execution algorithm B by machine learning by the learning equation A based on the usage histories collected by the laundry treating apparatus 20, the execution algorithm B may provide a more specialized course and option to the user who uses the clothing treating apparatus 10.

That is, the accuracy and suitability of a plurality of courses and options may be greatly improved by the calculator 410 by autonomously updating the execution algorithm B using the learning equation A. Accordingly, the laundry treating apparatus 20 may recommend courses and options tailored to the user's habits and environment as the usage history increases or time passes.

The calculator 410 may re-acquire the execution algorithm B when the collected usage histories reach a certain level. For example, when all the usage histories stored in the second memory 422 are replaced, the execution algorithm B may be re-acquired.

The first memory 422 may store the entire usage histories in order to re-acquire the execution algorithm B. The calculator 410 may be required to have a more complex calculation capability than the controller 400 configured to drive the driving part, the water supply valve, and the like. The calculator 410 may be configured as a parallel processing device capable of performing parallel processing for simultaneously processing different tasks through a plurality of processes.

The calculator 410 may be integrated with the main controller 400, or may be connected to the controller 400 to perform an operation required for the controller 400.

Accordingly, the controller 400 may be configured to independently execute the execution algorithm B. Therefore, even when the communication module 60 is disabled or the communicative connection between the server 10 or the external terminal 40 and the communication module 60 is blocked, the controller 400 may execute the execution algorithm B.

the communication module 60 may transmit any one of the execution algorithm B and the learning equation A from the server 10 to the controller 400. The controller 400 may replace any one of the learning equation A and the execution algorithm B stored in the storage unit 420.

In this way, the laundry treating apparatus 20 may acquire the latest version of the learning equation A and the execution algorithm B through the communication module 60, and may fix any problems with the learning equation A and the execution algorithm, such as bugs.

The communication module 60 may include a communication modem 62 capable of communicating with the AP 30, a communication microcomputer 61 configured to control the communication modem 62, and a RAM 63 configured to store information necessary for the communication microcomputer.

In this case, power may be supplied to the controller 400 and the communication module 60 by supplying power from the power supplier P to the laundry treating apparatus 20. When the operation of the laundry treating apparatus 20 is terminated, power to the controller 400 may be cut off in order to minimize consumption of standby power. However, power supplied to the communication module 60 may be maintained. This is intended to prevent the communication module 60 from repeating the setting mode for communicative connection with the AP 30 or the server 10 and to save time taken to enable or boot the communication module 60.

That is, even when all courses and options carried out by the laundry treating apparatus 20 are finished, electricity or power may remain supplied to the communication module 60.

Since power is always supplied to the communication module 60, the RAM 62 may periodically receive information from the server 10. Accordingly, when an input is provided through the recommendation requester 180, the local area information may be immediately transmitted to the controller 400. Accordingly, time taken to access the server 10 or receive the local area information from the server 10 may be saved.

The communication module 60 may always remain connected to the server 10. When power is applied and supplied to the controller 400, the communication module 60 may immediately receive the local area information from the server 10. When power is supplied to the controller 400 and the operating system is activated, the local area information may be stored in the storage unit 420 or immediately transmitted to the controller 400. Accordingly, as soon as power is supplied to the controller 400, the local area information may be reflected in the execution algorithm B.

The laundry treating apparatus of the present disclosure may use the aforementioned artificial intelligence or the execution algorithm provided by artificial intelligence to determine setting of a specific course or option among other courses or options, execute the specific course or option, change the setting of the specific course or option, and recommend the specific course or option.

The setting of the specific course or option may correspond to the drum RPM, water level, duration, water temperature, and rate of change thereof which are required to carry out the course or option. That is, the setting may correspond to a condition for carrying out the specific course or option.

Figure 8:
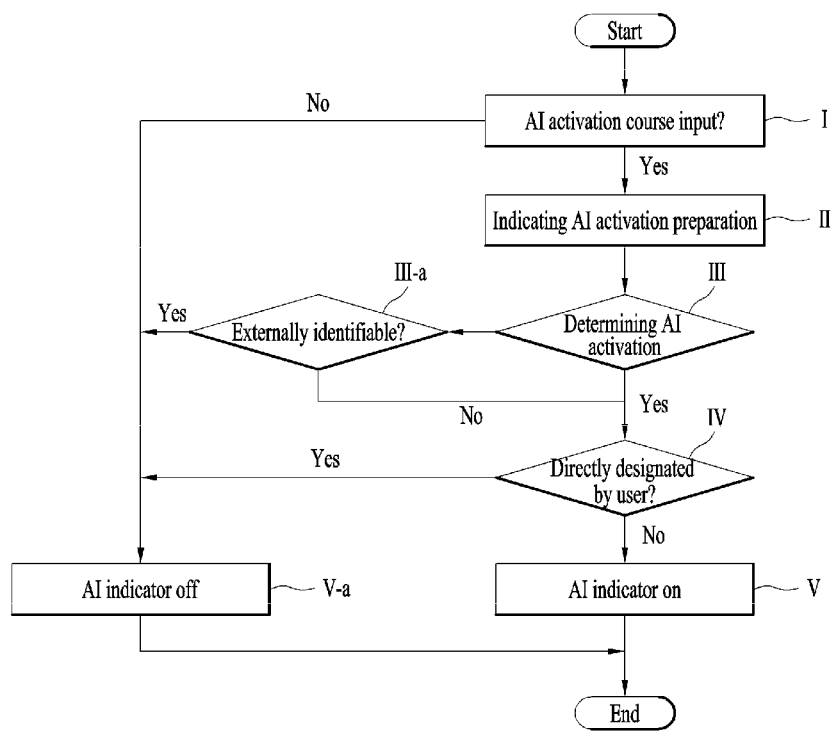
FIG. 8 is a diagram illustrating a structure through which the laundry treating apparatus of the present disclosure allows a user to recognize whether artificial intelligence is used.

Hereinafter, a method for controlling an online system including the laundry treating apparatus will be described with reference to FIG. 8.

The online system of the present disclosure may perform an AI activation course input step I of receiving a command for using artificial intelligence or an execution algorithm B provided by the artificial intelligence through the input unit 150.

The AI activation course may mean any course for which the online system causes the artificial intelligence or the execution algorithm to be used.

When the input unit 150 has a button or area that directly causes the artificial intelligence to be utilized, or when artificial intelligence is likely to be used for a course or option to be carried out according to an input through the input unit 150, the input step I may be detecting the input on the input unit 150.

The controller 400 or the server 10 may immediately determine whether the command input through the input unit 150 is a command for executing the artificial intelligence or the execution algorithm, but may be actually configured to check whether to execute the artificial intelligence or the execution algorithm in the process of preparing the execution of the course or option.

Therefore, when it is clear that the specific command input to the controller 400 or the server 10 through the input unit 150 in the input step I does not utilize artificial intelligence at all, the online system of the present disclosure may perform an AI indicator OFF step V-a of indicating that the received command does not utilize artificial intelligence. The AI indicator OFF step V-a may be a step of turning off the light emitter AI or keep the same turned off. Accordingly, the user may intuitively recognize that the specific command input does not utilize artificial intelligence.

In the input step I, when the controller 400 or the server 10 determines that the specific command may use the artificial intelligence or the execution algorithm B, an AI activation preparation indicating step II of receiving an input value necessary for use of the artificial intelligence or the execution of the execution algorithm B may be performed.

The AI activation preparation indicating step II may be a step of receiving a minimum input for deriving a result value of the execution algorithm B. For example, the AI activation preparation indicating step II may be a step of measuring the material or weight of the clothing in order to determine the optimal setting of the course or option. Alternatively, it may be a step of receiving or analyzing the local area information in order to recommend the course or option.

Since the AI activation preparation indicating step II is a step of preparing to execute the artificial intelligence or the execution algorithm B, the light emitter AI may be controlled to be turned on.

That is, when the online system of the present disclosure is ready to execute the artificial intelligence or the execution algorithm B, is using the same, or uses a result of use of the same, an AI indication ON step V of turning on the light emitter AI may be performed.

Accordingly, the user may check whether the light emitter AI is turned on, and recognize that the laundry treating apparatus of the present disclosure is allowed to at least utilize the artificial intelligence or the execution algorithm B.

The light emitter AI may be controlled by either the controller 400 or the control panel 100.

In the preparation step II, the light emitter AI may be controlled in a flickering state of repeating turning on and off. Accordingly, when the light emitter AI remains turned on, the user may recognize that the artificial intelligence or execution algorithm has been used. When the light emitter AI flickers, the user may recognize that the execution algorithm is being used or is prepared to be used.

In the AI activation preparation indicating step II, an AI activation determination step III of determining, by the controller 400 or the server 10, whether to use the result value of the execution algorithm B or the artificial intelligence may be performed. The determination step III may be a step of deriving a result value finally acquired using the artificial intelligence or execution algorithm B. Alternatively, the determination step III may be a step of determining that the execution algorithm B is to be executed or used to control the laundry treating apparatus 20.

In the determination step III, the controller 400 or the server 10 may finally determine not to use the artificial intelligence or the execution algorithm B, or may determine that the artificial intelligence or the execution algorithm B cannot be used because not all the input values required for the artificial intelligence or the execution algorithm B is received. In this case, the online system of the present disclosure may perform the AI indicator OFF step V-a.

Accordingly, the user may recognize that the artificial intelligence or the execution algorithm B cannot be used.

However, even when it is determined not to use the artificial intelligence or the execution algorithm B in the determination step III or the necessary information has not been received, it has been finally determined whether to use the artificial intelligence or the execution algorithm B in the determination step III. Accordingly, the AI indicator ON step V of turning on the light emitter AI may be performed.

That is, when it is not visually identified in the determination step III that the artificial intelligence or execution algorithm B is not performed, the indicator ON step V may be performed. Thereby, the user may be prevented from misunderstanding that the laundry treating apparatus 20 does not have or does not utilize artificial intelligence.

In addition, the user may be allowed to recognize that the laundry treating apparatus 20 is configured to utilize the artificial intelligence or the execution algorithm B. Accordingly, the user may be prevented from misunderstanding the reliability of the product.

When the execution algorithm B is not performed, the online system of the present disclosure may perform an identifiability determination step III-a of determining whether this state is externally identifiable.

When it is determined in the determination step III that the artificial intelligence or the execution algorithm B has not been carried out, and it is determined in the identifiability determination step III-a that the corresponding state is externally identifiable, the online system may perform the indicator OFF step V-a. Accordingly, the indication of the light emitter AI may be reliably maintained for the user.

When it is determined in the determination step III to use the artificial intelligence or the execution algorithm B, or it is determined in the identifiability determination step that the state of use of the artificial intelligence or the execution algorithm B is externally identifiable, the indicator ON step V may be performed.

The online system of the present disclosure may further include a user direct designation step IV of detecting whether a command for preventing intervention of artificial intelligence is input by the user. The user may desire to reflect his/her intention first by directly providing an input through the input unit 150 or the external terminal 40. That is, the user may desire to avoid intervention of the artificial intelligence by, for example, determining a specific course or option, determining the setting of the course or option, or setting a reservation time through the input unit 150 or the external terminal 40.

In this case, even if the artificial intelligence or the execution algorithm B is available for the input through the input unit 150 or the external terminal 40, the controller 400 or the server 10 may block the artificial intelligence or the execution algorithm B from being used. That is, when there is a strong intention of the user, the controller 400 or the server 10 may block the user's command from being changed to be optimized for the artificial intelligence or execution algorithm B.

In this way, the user's intention may be clearly reflected in the online system of the present disclosure. In this case, the online system of the present disclosure may perform the indicator OFF step in order to indicate that the artificial intelligence or the execution algorithm B is not used.

When the laundry treating apparatus 20 uses the result value obtained with the artificial intelligence or the execution algorithm B in the indicator ON step V, the operation of the treating apparatus 20 may be stopped due to occurrence of an error or the like in the laundry treating apparatus 20. Even in this case, the indicator ON step V may be maintained.

The error may correspond to a short circuit caused by excessive generation of vibrations, a fall of the laundry treating apparatus 20, or the like.

Even when which the operation of the laundry treating apparatus 20 is stopped, the light emitter 150 may remain turned on, thereby announcing to the user that the laundry treating apparatus 20 is utilizing the artificial intelligence.

The error or the like may be indicated using a separate indication method in the indicator 130.

Figure 9A:
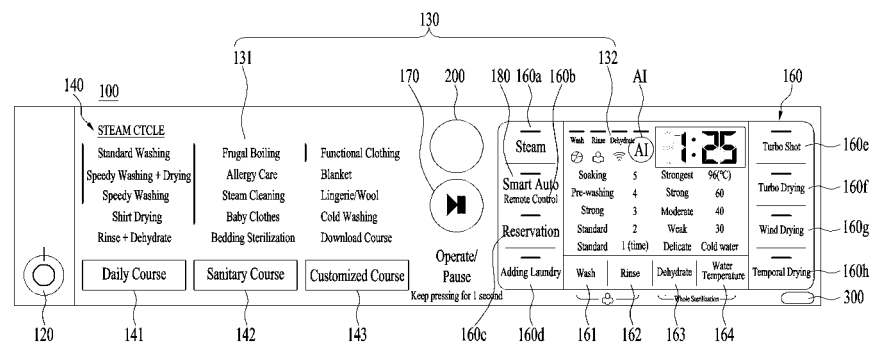
FIG. 9 illustrates an embodiment of a method for controlling the laundry treating apparatus of the present disclosure.
Figure 9B:
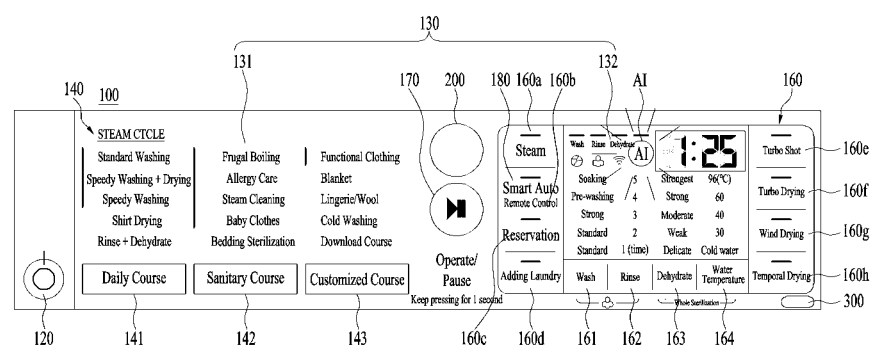
Figure 9C:
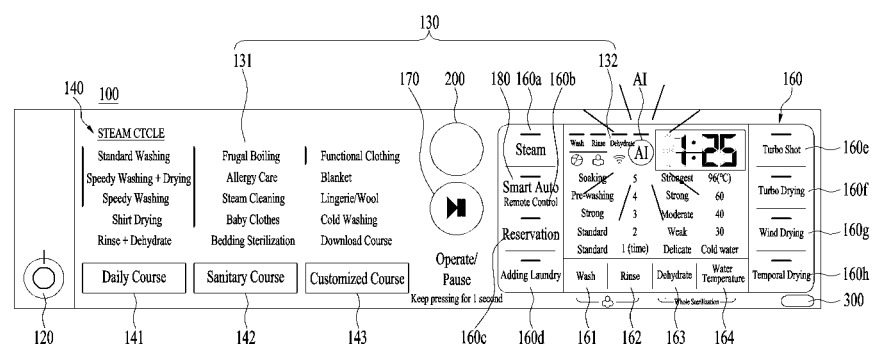

FIG. 9 illustrates an embodiment of implementation of a control method through the control panel 100.

Referring to FIG. 9-(a), the light emitter AI may be configured in the form of an icon on the option indicator 132 of the indicator 130 of the control panel 100. The light emitter AI may be configured in any form such as an LED, LCD, incandescent lamp, or the like as long as it is configured to selectively emit light.

The light emitter AI may initially remain in a light-off state. The user may recognize that the laundry treating apparatus of the present disclosure is configured to utilize artificial intelligence, based on the presence of the light emitter AI.

In addition, when the direct designation step IV in which the user clearly indicates that the user does not use artificial intelligence is performed, or when the state in which artificial intelligence is not used is identifiable from the outside, the indicator OFF step V-a in which the light emitter AI is turned off may be performed.

Referring to FIG. 9-(b), in the indicating step II, the light emitter AI may be turned on. At this time, the light emitter AI may be configured to flicker to cause the user to recognize that the controller 400 or the server 10 is ready to use the artificial intelligence or the execution algorithm B.

The light emitter AI may be controlled to emit relatively weak light without flickering, or may be controlled to emit light in another color.

Referring to FIG. 9-(c), after the determination step III, the controller 400 or the server 10 may perform the indicator ON step V of controlling the light emitter AI to remain turned on.

The indicator ON step V may be maintained regardless of the operating state of the laundry treating apparatus. Accordingly, the indicator ON step V may allow the user to recognize that the artificial intelligence is activated.

An embodiment of optimizing the setting of a course or option with the artificial intelligence or execution algorithm B will be described with reference to FIGS. 10 to 14.

Figure 10:
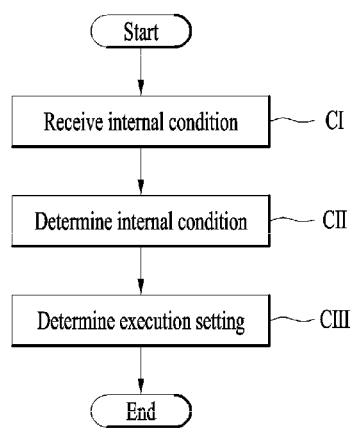
FIG. 10 illustrates an embodiment in which the laundry treating apparatus of the present disclosure recognizes the state of clothing through artificial intelligence.

Referring to FIG. 10, when a course or option capable of utilizing artificial intelligence is input through the input unit 150, the online system of the present disclosure may perform a condition receiving step CI of receiving an internal condition for optimal setting of the course or option. The condition receiving step CI may correspond to the AI activation course input step I.

The condition receiving step CI may be a step in which the controller 400 or the server 10 detects or receives the internal condition of the drum or the tub. That is, the condition receiving step CI may be regarded as a step of collecting input values to be input to the execution algorithm B.

Specifically, the step may include receiving a value of current or voltage applied or output to the driving part 25, or detecting a change in the water level of the tub.

Accordingly, the controller 400 or the server 10 may perform an internal condition determination step CII of finally determining the internal condition of the drum or the tub. For example, the internal condition determination step CII may be determining or recognizing the weight of clothing or the material of the clothing.

The internal condition determination step CII may correspond to the AI activation preparation indicating step II.

Once the controller 400 or the server 10 determines the internal condition of the tub or the drum, it may perform an execution setting determination step CIII of determining the setting of a course or option suitable for the determined condition. The execution setting determination step CIII may be a step of determining the optimal setting of the course or option by inputting the internal condition into the execution algorithm B.

The execution setting determination step CIII may correspond to the AI activation determination step III.

For example, when the course or option is a standard course or a standard option, the determination step may be a step of finally adjusting settings such as water level, water temperature, and RPM variation of the standard course or option optimized for the material or weight of the clothing. Accordingly, even when the same course or option is carried out, specific conditions for performing the course or option may vary depending on the internal condition of the drum or the tub.

Figure 11:
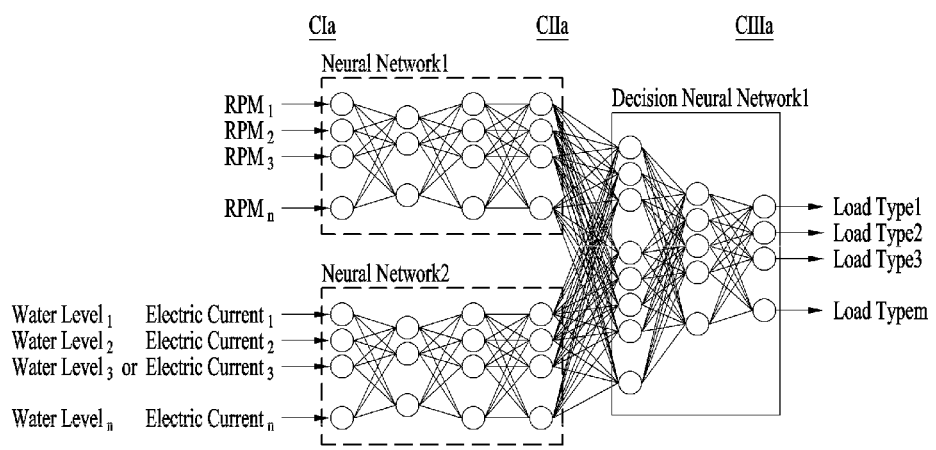
FIG. 11 illustrates an embodiment in which the laundry treating apparatus of the present disclosure recognizes the type or weight of clothing through artificial intelligence.

FIG. 11 illustrates determining the type of clothing using the control method of FIG. 10.

The laundry treating apparatus of the present disclosure may detect a load type of the clothing in order to determine settings for carrying out the course or option. The execution algorithm or artificial intelligence may be utilized even in detecting the load type of the clothing.

The laundry treating apparatus of the present disclosure may detect the load of the clothing through an internal reception step (CIa)

The controller 400 may rotate the driving part 25 in a forward or reverse direction or change the rotation direction, thereby receiving the change in rpm of the drum, the change in water level of the tub, and the change in current/voltage applied to the driving part 25.

In the laundry treating apparatus of the present disclosure, the controller 400 may input the change in rpm of the drum, the change in water level of the tub, and the value of the driving part 25 to the execution algorithm B through the internal condition determination step (CIIa).

The execution algorithm (B) is configured as follows.

The execution algorithm B may be receive a plurality of input values and derive one output value. The execution algorithm (B) may be configured as a neural network or a continuous neural network.

The controller 400 or the server 10 of the laundry treating apparatus of the present disclosure may determine the load type by outputting the result of the execution algorithm (B) through an execution determination step CIIIa. That is, the weight and material of the clothing may be identified at once.

For example, when RPM1, water level change 1, and current value 1 are received by controlling the driving part 25 and input to the execution algorithm B, the execution algorithm B may output a result indicating that the clothing is made of cotton (Load type 1).

For example, when RPM2, water level change 1, and current value 1 are received by controlling the driving part 25 and input to the execution algorithm B, the execution algorithm B may output a result indicating that the clothing is a mixture of cotton clothing and jeans (Load Type 2).

That is, the controller 400 may be configured to derive one output value through the execution algorithm B based on a plurality of input values. This is difference from the conventional controller, which collects only one condition to derive one output value.

Figure 12:
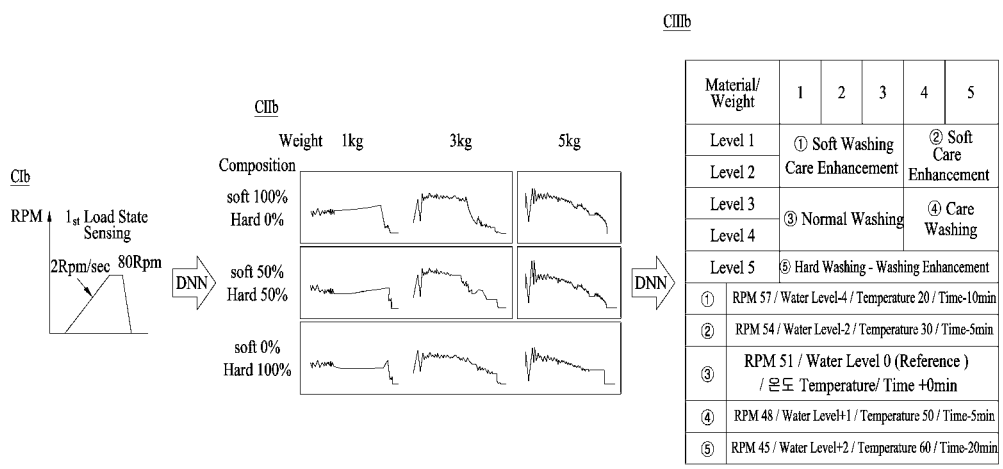
FIG. 12 illustrates an embodiment in which the laundry treating apparatus of the present disclosure determines a course or an option through artificial intelligence.

FIG. 12 illustrates an embodiment of determining the setting of a course or an option using the control method of FIG. 10.

The laundry treating apparatus of the present disclosure may control the drum to accelerate or decelerate to a specific RPM while performing the internal condition receiving step cib. In this case, the light emitter AI may flicker.

The laundry treating apparatus of the present disclosure may perform the internal condition determination step CIIb of determining the weight and material of the clothing through the execution algorithm B based on the RPM waveform of the drum in the process of acceleration and deceleration of the drum.

The execution algorithm B may analyze whether the clothing is composed of 100% soft material or 50% hard material. In this case, the light emitter AI may still flicker.

The laundry treating apparatus of the present disclosure may determine the specific setting of the course or option using the execution algorithm B based on the analyzed clothing weight and material through an execution setting determination step CIIIb. In this case, the light emitter AI may remain turned on.

When the clothing weight and material are derived through the execution algorithm B, the controller 400 may input the result values into a table or change the course or option settings, further using the execution algorithm B.

For example, when execution of the standard course or option is input, the default setting values may correspond to clothing material level 3, clothing weight of 3 kg, RPM51, reference water level, temperature of 40° C., and reference time.

In this case, when it is detected through the execution algorithm B that the material of the current clothing is 100% soft and the clothing weight is 1 kg, the controller 400 may increase the RPM by 7, lower the water level by 4, lower the temperature by 20° C., and reduce the duration by 10 minutes, compared to the standard course or option.

The amount of change in the setting may be an optimal result derived by the artificial intelligence in consideration of a situation in which the drum speed may be further increased when the clothing is soft and thus the UB(unbalance) is small, and a situation in which water may be excessively supplied due to the large amount of absorbed moisture. The amount of change in the setting may be an optimized numerical value derived by the server 10 or the like through the execution algorithm B, and may be written in a table and stored in the controller 400.

Figure 13:
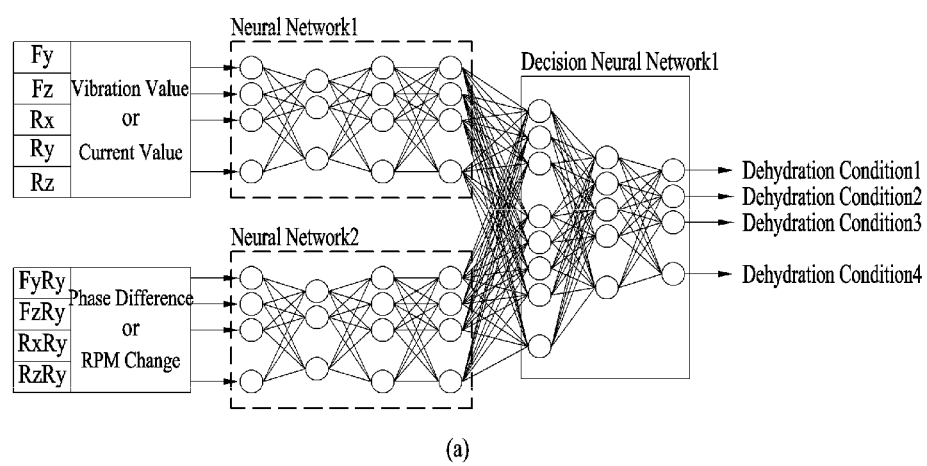
FIG. 13 illustrates an embodiment in which the laundry treating apparatus of the present disclosure determines the dehydration condition through artificial intelligence.
Figure 13:
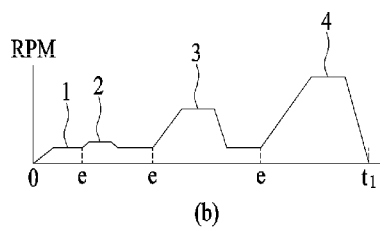
Figure 13:
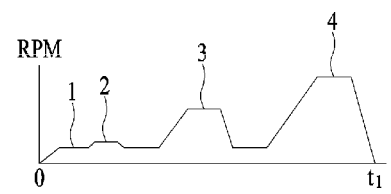
Figure 13:
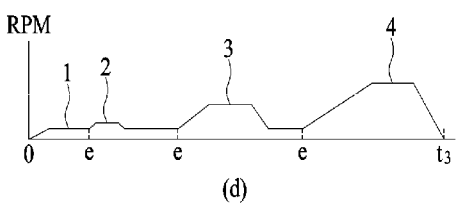
Figure 13:
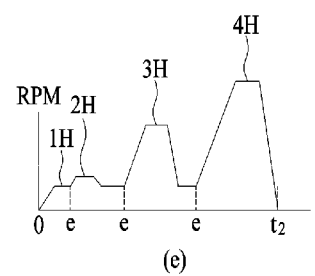

FIG. 13 shows an embodiment in which only a part of the course or option settings is changed using the control method of FIG. 10.

Referring to FIG. 13-(*a*), the laundry treating apparatus of the present disclosure may be configured to change the conditions for some cycles using artificial intelligence or an execution algorithm during the setting of the course or option.

For example, it may be configured to change the dehydration condition of a specific course or option.

Through the internal condition receiving step C1, the laundry treating apparatus may receive vibration values along of the X, Y, and Z axes and a current value, or receive a phase difference and a change in RPM with respect to the X, Y, and Z axes.

In this case, the light emitter AI may be controlled to flicker.

The laundry treating apparatus may detect the weight or material of the clothing through the internal condition determination step CII, or may determine the dehydration condition by continuously performing the execution setting determination step CIII immediately.

In this case, the light emitter AI may be controlled to be turned on.

FIG. 13-(*b*) depicts the change in rpm of the drum during the dehydration cycle under dehydration condition 1, which is the most basic condition. The operation is performed under the reference condition of the weight and material of the clothing for time t1. The drum may be gradually accelerated or the speed thereof may be increased as unbalance is detected during operation at a constant speed.

Here, when the unbalance increases beyond a reference value, the interruption (e) of decreasing the rotational speed of the drum or stopping rotating the drum may be performed.

FIG. 13-(*c*) depicts the dehydration condition 2 implemented when the material of the clothing is relatively soft and the weight of the clothing is a reference value.

Since the material of the clothing is soft, the clothing may be evenly spread inside the drum without being lumped. Accordingly, it is expected that significant unbalance will not occur, and therefore the controller 400 may skip the interruption (e) in the dehydration condition.

FIG. 13-(*d*) depicts dehydration condition 3 implemented when the material of the clothing is hard and the weight of the clothing is heavy.

Since the material of the clothing is hard, the clothing may be lumped inside the drum, and the unbalance may be considerably large. Therefore, the speed of the drum may be set lower than in dehydration condition 1. Since the speed of the drum is low, the dehydration effect may be secured by increasing the dehydration time t3.

FIG. 13-(*e*) depicts dehydration condition 4 implemented when the material of the clothing is soft and the weight of the clothing is light.

Since the material of the clothing is hard and the weight of the clothing is light, the speed of the drum may be increased more excessively. However, when the speed of the drum is excessive, unbalance or excessive vibration may occur. Accordingly, the interruption condition (e) may be maintained.

In other words, since the execution algorithm B is derived from various data for performing the dehydration cycle through deep learning, the optimal dehydration condition may be set according to the weight and material of the clothing.

Figure 14:
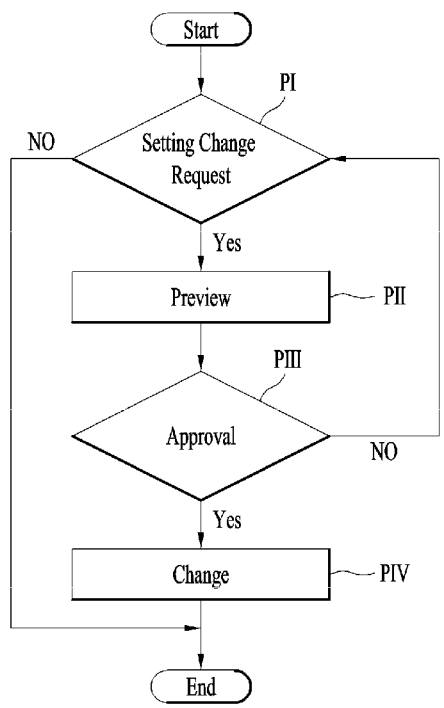
FIG. 14 illustrates an embodiment in which the laundry treating apparatus of the present disclosure changes the settings of a course or option through artificial intelligence.
Figure 15:
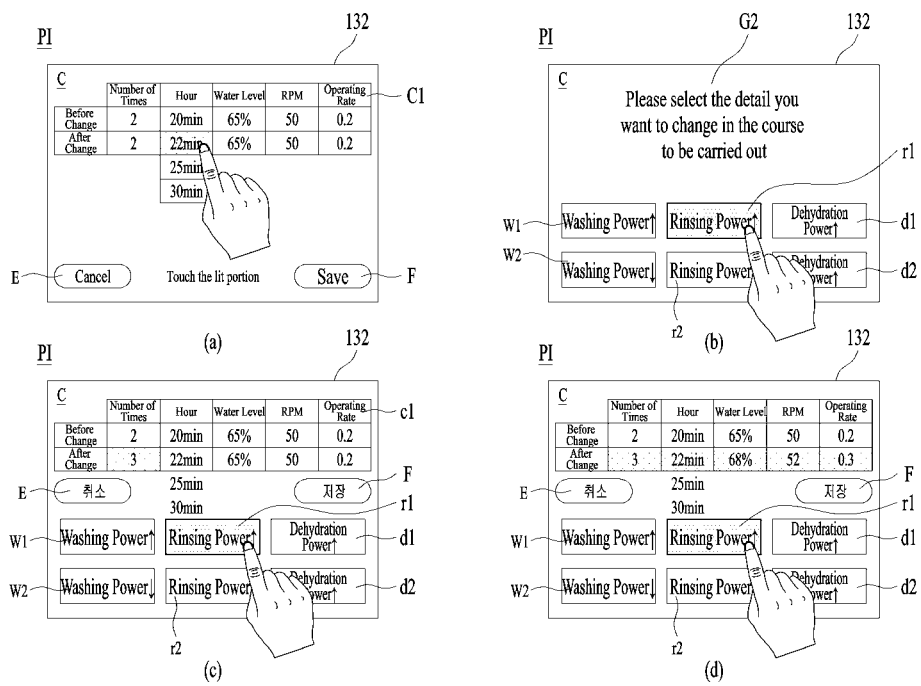
FIG. 15 illustrates an embodiment in which the laundry treating apparatus of the present disclosure changes the setting of a course or option through artificial intelligence is implemented in the indicator.

FIGS. 14 to 15 illustrate an embodiment in which the laundry treating apparatus of the present disclosure changes the settings of a course or option using artificial intelligence or an execution algorithm.

FIG. 14 illustrates an embodiment of a method for controlling the laundry treating apparatus 20 of the present disclosure.

Upon receiving an input from the input unit 130, the controller 400 of the laundry treating apparatus 20 of the present disclosure may determine a specific course or option from among courses or options for performing at least one of a washing cycle of removing foreign substances from clothing or a drying cycle of removing moisture from clothing. Upon receiving an input from the operation part 170, the controller may carry out the course or option.

The user may be unsatisfied with the result of the course or option. Accordingly, a setting change request step P1 of inputting, through the input unit 150, a command for changing the settings of the course or option may be performed.

The setting change request step P1 may correspond to the AI activation course input step I.

In the setting change request step P1, the controller 400 may receive specific change information for changing a specific setting among the settings of the specific course or option.

The change information may be related to directly changing the settings of the course or option, or changing a function of the course or option. When the specific change information is input, the controller 400 may perform a preview step PII of pre-reflecting the changed setting of the course or option corresponding to the input of the change information using the execution algorithm B and indicating the same on the indicator 130. The preview step PII may correspond to the AI activation preparation indicating step II. Accordingly, the light emitter AI may be turned on.

The change information may be comprehensive information for increasing or decreasing washing power, rinsing power, dehydration power, and the like in the course or option. Accordingly, the controller 400 may optimize and change the setting corresponding to the received input through the execution algorithm B. A specific method for using the execution algorithm B will be described later.

The controller 400 may perform an approval step PIII of receiving a command for approving or rejecting the setting of the specific course or option changed using the execution algorithm B. When an input is provided through the input unit 130 or a save button marked on the indicator 130 in the approval step PIII, the controller 110 may perform a change step PIV of changing the setting of the specific course or option.

The change step may correspond to the user direct designation step IV. Accordingly, the light emitter AI may be turned off. Thus, the user may recognize that artificial intelligence was utilized to reflect his/her intention, but the data is stored in the controller 400 without intervention of the artificial intelligence when the intention is finally reflected.

When an input is provided through the input unit 130 or through a cancel button B marked on the indicator 130, the controller 110 may terminate the operation of the laundry treating apparatus.

FIG. 15 illustrates an embodiment in which feedback may be input through the control panel 100.

The course or option may be provided with various settings for performing the washing cycle and the drying cycle. For example, the settings may include the total time of rotation of the driving part, the rpm of the driving part, an operating rate of the driving part, an opening time of the water supply valve, or the water level of the tub given when the course or option is carried out. To this end, change information for directly or indirectly changing the settings may be indicated on the indicator 130. The change information may include a button icon for changing one or more of the number of repetitions of the course or option, the total duration, the rpm of the driving part, the operating rate of the driving part, the opening time of the water supply valve, or the water level of the tub.

Referring to FIG. 15-(*a*), when the course or option is terminated, change information C may be indicated on the indicator 130. Alternatively, when the course or option is terminated and a feedback request indicated on the indicator 130 is approved, the change information C may be indicated on the indicator 130.

The change information (C) may be configured to change one or more of the total duration, the rpm of the driving part, the operating rate of the driving part, the opening time of the water supply valve, or the water level of the tub among the settings of the course or option.

The change information C may be indicated in the form of a current setting state of the course or option and a table C1 for changing the setting state.

The user may change a setting by directly inputting the setting to be changed in the table C1. In addition, the table C1 may display a setting value that may be changed such that the setting is changed step by step.

For example, when an input is provided through a setting part related to the duration in the table C1, settings related to the duration that may change the duration step by step may be indicated in the table C1, and the user may select a desired duration among the settings. When the duration of an existing course or option is 20 minutes, set values such as 15 minutes, 25 minutes, and 30 minutes may be indicated in the table C1, and the user may change the settings related to the duration by selecting one of the values.

In addition, the change information C may be configured to change the entire settings of the specific course or option. Alternatively, it may be configured to change only the setting of a process in the specific course or option. For example, when the specific course or option is composed of a series of washing, rinsing, and dehydration processes, the change information may be configured to change only a part of the processes. Accordingly, the user's intention to change only a part of the specific course or option may be reliably reflected.

For example, when the laundry treating apparatus 1 is configured as a washing machine, the change information may include one or more of washing change information w configured to increase or decrease at least one of the number of repetitions, the total duration, the rpm of the driving part, the operating rate of the driving part, the opening time of the water supply valve or the water level of the clothing accommodation part related to the washing process of the specific course or option, and rinsing change information r configured to increase or decrease at least one of the number of repetitions, the total duration, the rpm of the driving part, the operating rate of the driving part, the opening time of the water supply valve, or the water level of the clothing accommodation part related to the rinsing process of the specific course or option.

The change information may further include dehydration change information d configured to increase or decrease at least one of the number of repetitions, the total duration, the rpm of the driving part, the operating rate of the driving part, the opening time of the water supply valve, or the water level of the clothing accommodation part related to the dehydration process of the specific course or option.

The indicator 130 may display all the existing settings and the changed settings in a change window c1 such that the settings may be compared. That is, the change window c1 may be configured to display the existing settings and the changed settings together to allow the user to check the changed settings before the controller determines the changed settings.

In addition, a save button F to approve change of the settings of the course or option to the changed settings and a cancel button E may be presented on the indicator 130.

When an input is provided through the save button F, the settings of the course or option may be changed and stored in the controller 110 or the server 10. Accordingly, the changed settings may be reflected in carrying out the next course and option. When an input is provided through the cancel button E, the changed settings may be canceled. When an additional input is provided, the procedure of reflecting the feedback may be completely terminated.

The user may not know exactly which of the settings to change. For example, the user desires to enhance the rinsing power, but may not know exactly which of the above settings to increase or decrease. In addition, the user may not know whether to change only one of the settings or to change two or more of the settings. Moreover, when the user excessively changes the settings, the function of the laundry treating apparatus may not be exhibited or the clothing may be damaged.

Therefore, the laundry treating apparatus 1 of the present disclosure and the online system including the same may be configured to receive only feedback on the function of a course or option from the user and to change and improve the settings using the execution algorithm B.

Referring to FIG. 15-(*b*), the change information C may be indicated by an icon on the indicator 130.

Specifically, the change information C may include washing change information w, rinsing change information r, and dehydration change information d. In this case, the washing change information w may be indicated by washing increase/decrease icons w1 and w2 for increasing or decreasing washing power, the rinsing change information r may be indicated by rinsing increase/decrease icons r1 and r2 for increasing or decreasing rinsing power, and the dehydration change information d may be indicated by dehydration increase/decrease icons d1 and d2 for increasing or decreasing dehydration power. In addition, a setting to be changed when an input is provided through each of the icons may be matched with each icon and stored in the controller 110 or the server 10.

For example, the washing increase/decrease icons may include a washing increase icon w1 for increasing washing power and a washing decrease icon w2 for decreasing washing power. The rinsing increase/decrease icons may include a rinsing increase icon r1 for increasing rinsing power and a rinsing decrease icon r2 for decreasing rinsing power. The dehydration increase/decrease icons may include a dehydration increase icon d1 for increasing dehydration power and a dehydration decrease icon d2 for decreasing dehydration power.

Accordingly, the user may request that the settings of the course or option be changed simply by inputting the icons, and the controller 110 or the server 10 may change the course or option to settings optimized for the user's request for change. Even when the user does not have sufficient knowledge about the laundry treating apparatus 1 or does not know the details of the settings of the course or option, the user may intuitively input a desired setting by inputting the icon type change information C.

A guide text message G2 may also be presented on the indicator 130 to guide the user to input the icon type change information C and provide a desired feedback.

FIGS. 15-(c) and 15-(d) illustrates an embodiment in which the user provides an input through the rinsing increase icon r1.

When the rinsing increase icon r1 is input, the indicator 130 may present a setting for enhancing the rinsing power.

Specifically, the existing settings of the course or option and the changed settings of the course or option established by the input through the rinsing increase icon r1 may be presented on the indicator 130. Accordingly, the user may specifically recognize which setting is changed to enhance the rinsing power.

Referring to FIG. 15-(c), when the rinsing increase icon r1 is input, all the settings may be increased. Also, referring to FIG. 15-(d), when the rinsing increase icon r1 is input, all the settings may be sequentially changed from the setting that has the greatest influence on the rinsing power to the setting that has the least influence on the rinsing power, or some of the settings may be changed gradually at the same time.

For example, the number of times of rinsing in the course or option may be increased first whenever the rinsing increase icon r1 is input. Thereafter, the rinsing time and the rinsing water level may be increased, and finally, the rpm and the operating rate of the driving part may be increased in the rinsing step.

The order and degree of the changes may be reflected in the controller 110 or the server 10 through the execution algorithm B.

Conversely, when the rinse decrease icon r2 is input, the set values may be decreased. The washing increase/decrease icon w and the dehydration increase/decrease icon d may also be applied in a similar manner. However, the number of times of operation, rpm, and operating rate have a greater influence on the washing power and dehydration power. Accordingly, when the icon w, d is input, the number of times of operation, rpm and operating rate may be changed first, and then the water level or the duration may be changed.

In this way, the user may change the setting of the course or option as much as desired by simply selecting an increase or decrease of the function of the course or option. That is, settings affecting the washing power, rinsing power, and dehydration power of the course or option may be determined by receiving inputs through corresponding icons and reflecting the same.

Of course, the input of the change information or the inputs of the icons may be replaced with any one button in the input unit 130.

Figure 16:
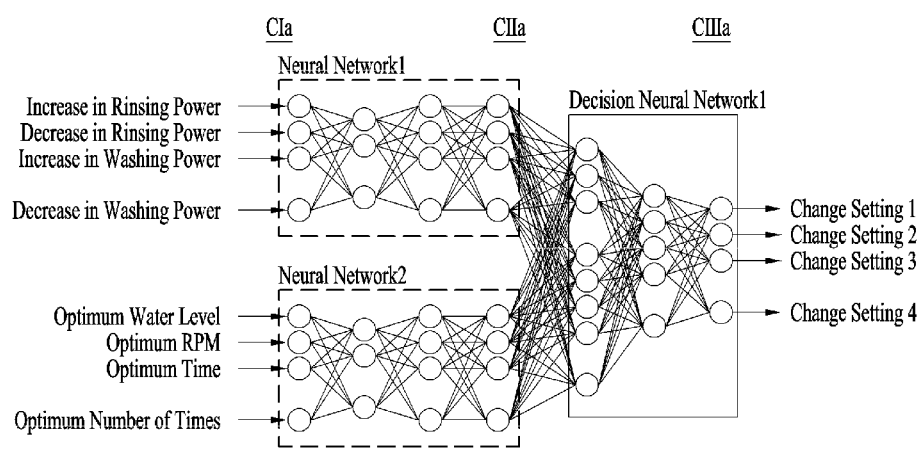
FIG. 16 shows an embodiment in which a set value changed through change information is optimally set by a deep learning algorithm (execution algorithm).

FIG. 16 shows an embodiment in which a set value changed through change information is optimally set by a deep learning algorithm (execution algorithm).

The set value changed through the change information may be determined by the controller 100 or the server 10 through the execution algorithm B. That is, even when the user does not know how much to change a setting, the server 10 or the controller 400 may determine a numerical value of change suitable for the laundry treating apparatus 1 by the execution algorithm B.

For example, the amount of change by which a setting is changed when the change information is input once may be pre-stored in the server 10 or the controller 400.

To this end, the server 10 may collect big data about numerical values by which users change settings, or numerical values studied by a producer who studies the settings, or both. Accordingly, the server 10 or the controller 100 may determine the optimal amount of change of the setting by performing deep learning or machine learning on the big data based on artificial intelligence.

Figure 17:
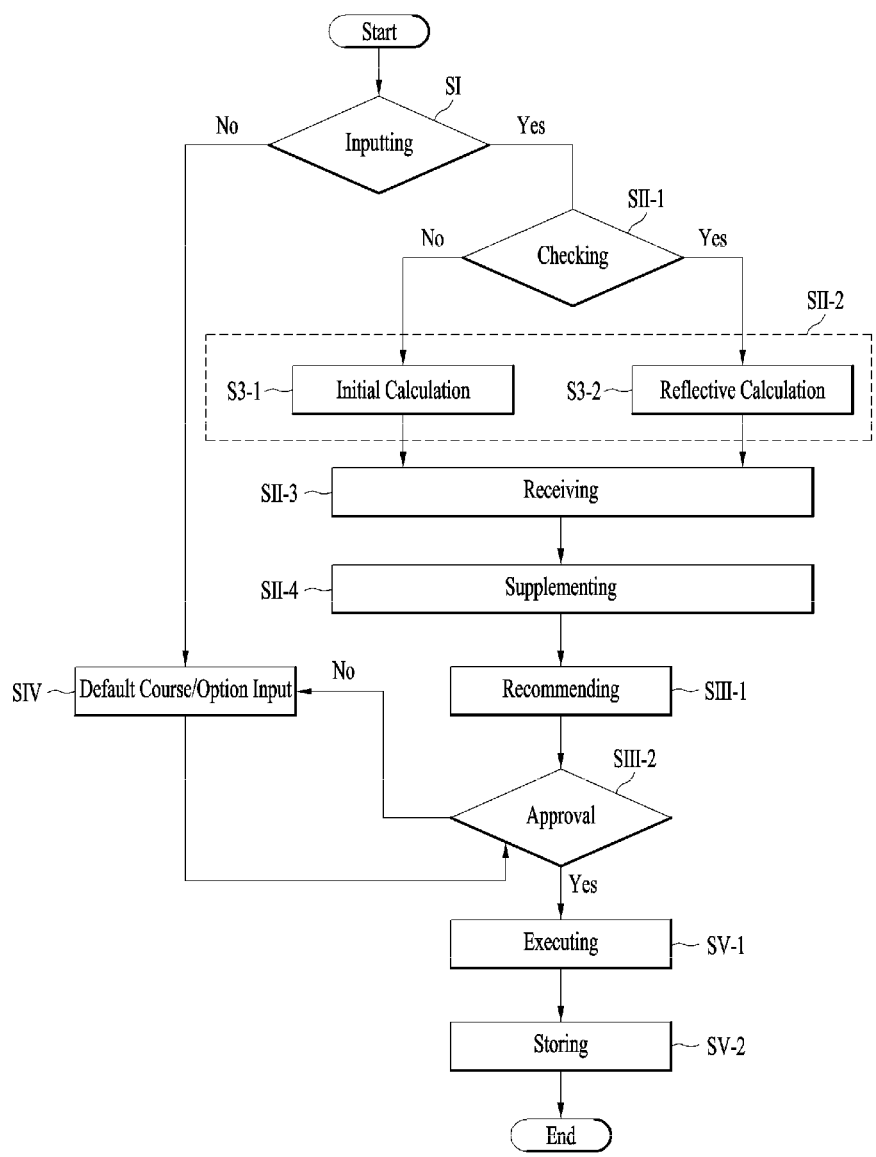
FIG. 17 illustrates an embodiment in which the laundry treating apparatus of the present disclosure may recommend an optimal course or option through artificial intelligence.

FIG. 17 illustrates an embodiment in which the laundry treating apparatus of the present disclosure may recommend a specific course or option among courses or options through an execution algorithm.

Hereinafter, a control method by which the laundry treating apparatus 20 of the present disclosure may predict and recommend a customized course and option to a user will be described with reference to FIG. 17.

The laundry treating apparatus 20 of the present disclosure may include a communication module 60, a controller 400, an indicator 130, an input unit 150, an operation part 170, and a recommendation requester 180 (see FIGS. 4 and 9)

When power is supplied to the laundry treating apparatus 20 or the controller 400, the method may include an inputting step SI of detecting whether an input is provided through the recommendation requester 180, a calculation step SII-2 of determining a course and option expected to be used by the specific user when the input through the recommendation requester 180 is detected, and a recommendation step SIII-1 of indicating the calculated course and option on the indicator 130.

The inputting step SI may correspond to the AI activation course input step I, and the operation step SII-2 may correspond to the AU activation indicating step II.

The recommendation requester 180 defined in the inputting step SI is an element configured to detect the user's intention to receive a recommended course and option suitable for the current situation from the server 10 or the laundry treating apparatus 20. That is, the recommendation requester 180 may be a specific switch disposed on the control panel 100.

When the user's motion or voice is recognized by the controller 400 and a course and option suitable for the current situation are recommended, the camera 200 or the microphone 300 may also serve as the recommendation requester 180.

When the user sets the washing machine to recommend a customized course and option through an application on the external terminal 40, the external terminal 40 may also serve as the recommendation requester 180.

In other words, the input unit 150 may correspond to the switch, the microphone 300, or the camera 200 provided in the control panel 100, or may correspond to the external terminal 40. Accordingly, detecting whether an input is provided through the input unit 150 may mean recognizing a specific action performed by the user who desired to receive a recommendation of a course and option through the aforementioned components.

When the user does not provide an input through the recommendation requester 180 in the inputting step SI, the user does not want a recommendation of a course or option, and therefore a step of providing or recommending a default course and option may be performed by the laundry treating apparatus 20 (SIII-1).

The default course may be a course formally provided by the course input unit 140, and the option may be an option formally provided by the option selector 160.

The step of providing or recommending the default course and option may be an operation of activating the course selector 140 and the option selector 160 by the control panel 100.

The controller 400 may perform an approval detection step SIII-2 of detecting that the user selects or does not select the course selector 140 and the option selector 160.

The approval detection step SIII-2 may be to detect whether the user provides an input through the operation part 170. When the user provides an input through the operation part 170, the controller 400 may perform an execution step SV-1 of carrying out the course and option selected by the user, and a storage step SV-2 of storing the usage history of the user in the controller 400 to train the execution algorithm B.

The calculation step SII-2 is a step of calculating, through the execution algorithm B, a course and option which are expected to be used by the user or are the most suitable course and option at the current time by the controller 400.

The execution algorithm B may reflect the usage history of the specific user or a new user, or the usage history may not be reflected for reasons, for example, because the specific user or the new user uses the laundry treating apparatus 20 for the first time In order to distinguish whether the usage history is reflected, when an input provided through the recommendation requester 180 is detected, the controller 400 may perform a checking step SII-1 of checking whether the specific user has ever used the laundry treating apparatus.

When it is detected in the checking step SII-1 that there is the usage history of the specific user stored, the controller 400 may perform a reflective calculation step S3-2 of calculating the expected course and option specialized for the specific user by reflecting the history of the specific user in the execution algorithm B.

However, when there is no usage history of the specific user in the checking step SII-1, the controller 400 may perform an initial calculation step S3-1 of calculating a course expected to be used by the specific user at the current time and a recommendation step through the execution algorithm B provided by the server 10.

In the initial calculation step S3-1, the execution algorithm B to which the controller 400 may access does not have any history of the specific user, and thus the controller 400 may calculate the course and recommendation step for the specific user based on the usage histories of a plurality of unspecified users reflected when the execution algorithm B is generated by the server 10.

The aforementioned current time may mean that the above-mentioned date, day, time, and the usage history and pattern of courses and options used by a plurality of users and the specific user are all reflected.

The execution algorithm B may be stored in the controller 400. Alternatively, when there is a request from the controller 400, the laundry treating apparatus 20 may connect to the server 10 through the communication module 60 to access the execution algorithm or the recommendation formula B stored in the server 10.

That is, the calculation step SII-2 may include the initial calculation step S3-1 and the reflective calculation step S3-2. The calculation step SII-2 may be referred to as a step of recommending a course and options to the user based on the user's pattern.

The pattern or usage history corresponding to the specific user may include a history including one or more of a time, date, and day of the week when the specific user used the laundry treating apparatus 20, and a history of courses and options carried out at each time and on the date and day of the week when the laundry treating apparatus were used.

The history and pattern may be used to generate or train the execution algorithm B, and may be an input value for the execution algorithm B.

The communication module 60 may be configured to communicate with an external agency 50 that provides information on the local area where the specific user is located.

The external agency 50 and the communication module 60 may communicate directly. Alternatively, the communication module 60 may indirectly communicate with the external agency 50 in a manner in which the communication module 60 communicates with the server 10, and the server 10 communicates with the external agency 50.

When the controller 400 recommends a course and option based on the user's pattern or usage history, current local area information may not be reflected.

Accordingly, the laundry treating apparatus of the present disclosure may further include a receiving step SII-3 of receiving the local area information through the communication module 60, and a supplementing step SII-4 of adjusting, by the controller 400, at least one of the calculated course and option by reflecting the local area information.

The local area information may include at least one of weather information providing information about whether it is raining in the area where the specific user is located and the probability of precipitation, atmospheric information providing a temperature, humidity, and air pollution status in the area, earthquake information providing whether there is an earthquake in the area, water quality information providing the water quality in the area, or electricity rate information for each time in the area.

The supplementing step SII-4 may a step of adjusting the option including at least one of the washing intensity, the number of times of rinsing, the dehydration intensity, apparatus washing, the operation duration, the water temperature, or steam supply, based on the received local area information.

Supplementing the course and option through the local area information in the supplementing step SII-4 has been described above, and thus description thereof is skipped to avoid redundant description.

The weather information and the atmospheric information may include the weather information and the atmospheric information for a predetermined period before using the laundry treating apparatus.

The weather information and the atmospheric information correspond to information about a certain period because the weather and atmospheric information at the current time may not reflect the weather and atmospheric information in the past. The certain period may be one week or three days.

For example, when it was sunny and there was a lot of fine dust yesterday, clothing may be in a contaminated state even if it is cloudy there is no fine dust in the air today.

Accordingly, the laundry treating apparatus 20 needs to add an option for increasing the number of times of rinsing and washing intensity and supplying steam for washing or sterilization of the contaminated clothing.

Accordingly, in the local area information, information for a certain period of time needs to be considered for the weather information and the atmospheric information.

In the recommendation step SIII-1, when the controller 400 recommends a course and option suitable for the user using the execution algorithm B, and completes adjusting the same by reflecting the local area information, at least one of the course and option may be indicated to the user on the indicator 130.

The user may check the recommended course and option through the indicator 130.

Of course, the recommendation step SIII-1 may include indicating the course or option to the user in a manner such as a push notification on the external terminal 40.

The controller 400 may perform the approval detection step SIII-2 of detecting the approval from the specific user in the recommendation step SIII-1. When the intention of approval such as an input on the operation part 170 is detected in the approval detection step SIII-2, an execution step SV-1 of operating the laundry treating apparatus according to the course and option indicated in the recommendation step may be further included.

In the approval detection step SIII-2, performed after the recommendation step SIII-1, the user may provide an input through the operation part 170 when the course and option recommended in the recommendation step is what the user has expected to use or is considered appropriate. That is, the approval detection step SIII-2 may be construed as a step in which a command to operate the laundry treating apparatus 20 is input according to the input provided through the operation part 170. When the input is provided through the operation part 170, the laundry treating apparatus 20 may operate according to the course and option.

Thereafter, when the course and option are completed, a storage step SV-2 of storing the usage history of the course and option in the controller 400 may be performed. The stored usage history may be used to train the execution algorithm B. By learning the specific user's pattern, a more precisely customized course and option may be recommended. In addition, the usage history may be configured as an input to the execution algorithm B.

The user may need to reject the recommended course and option. In this case, a default course and option inputting step SIV may be performed.

That is, the user may ignore the recommended course and may directly select the course input unit 130 and the option selector 160 to set a course and option. Thereby, the limitations of the execution algorithm B may be overcome and the user's active intention to use the course or option may be reflected.

As described above, the laundry treating apparatus 20 may include a camera 200 capable of recognizing the motion of the specific user. In the detection step S1, the specific motion of the specific user may be recognized to detect whether the input is provided.

In addition, the laundry treating apparatus 20 may include a microphone capable of recognizing the voice of the specific user. In this case, in the inputting step SI, a stored voice command of the specific user may be recognized to detect whether the input is provided.

The communication module 60 may be configured to communicate with the external terminal 40 capable of remotely controlling the laundry treating apparatus 20, and information about whether the input is provided may be remotely received from the external terminal 40.

The recommendation step SIII-1 may include recommending a suitable date or time for operation of the laundry treating apparatus to the external terminal 40 based on the weather information and waiting information for a certain period before the use of the laundry treating apparatus.

The inputting step SI may correspond to the AI activation course input step I.

The checking step SII-1 and the calculation step SII-2 may correspond to the AI activation preparation indicating step II. Accordingly, the light emitter AI may be controlled to flicker.

The recommendation step SIII-1 and the approval detection step SIII-2 may correspond to the AI activation determination step (III). Accordingly, the light emitter AI may be controlled to be turned on.

The default course inputting step SIV may correspond to the user direct designation step IV. Accordingly, the light emitter AI may be controlled to be turned off.

The present disclosure may be modified and implemented in various forms, but the scope of the present disclosure is not limited to the above-described embodiments. Therefore, if a modified embodiment includes the elements of the claims of the present disclosure, it should be regarded as belonging to the scope of the present disclosure.

What is claimed is:

1. A laundry treating apparatus configured to perform courses including at least one of a washing cycle for removing foreign substances from clothing or a drying cycle for removing moisture from the clothing, and to perform the courses with options that relate to conditions of the courses and that include an intensity of the courses and a number of times of execution of the courses, the laundry treating apparatus comprising:
   a controller configured to perform operations including:
      determining a setting of a course among the courses or an option among the options,
      changing the setting of the course or the option, and
      recommending the course among the courses or the option among the options using artificial intelligence, wherein the using of the artificial intelligence includes executing an execution algorithm determined by the artificial intelligence; and
   an indicator configured to indicate a state of the controller to an outside of the laundry treating apparatus,
   wherein the indicator is configured to indicate a use of the artificial intelligence by the controller to the outside,
   wherein the indicator comprises a light emitter configured to indicate the use of the artificial intelligence for recommending the course or the option by the controller to the outside,
   wherein the light emitter is configured to be turned on while the controller uses the artificial intelligence and to remain turned on after the controller has completed the use of the artificial intelligence, and
   wherein the light emitter is configured to flicker (i) in a use state in which the artificial intelligence or the execution algorithm is being used by the controller and (ii) in a ready state in which the artificial intelligence is available to be used by the controller.

2. The laundry treating apparatus of claim 1, wherein the light emitter is configured to remain turned on in an error state in which the course or the option recommended using the artificial intelligence is not to be performed.

3. The laundry treating apparatus of claim 1, further comprising:

an input unit configured to receive a command to carry out the course or the option, wherein the light emitter is configured to be turned off based on the command being received through the input unit.

4. The laundry treating apparatus of claim 1, wherein the light emitter is configured to, based on the controller using the artificial intelligence, remain turned on regardless of whether a result from the artificial intelligence is reflected to the operations of the controller.

5. The laundry treating apparatus of claim 1, further comprising:
a cabinet that defines an exterior of the laundry treating apparatus;
a tub accommodated in the cabinet and configured to receive water;
a drum rotatably arranged in the tub and configured to receive the clothing;
a driving part coupled to the tub and configured to rotate the drum; and
a water level sensor configured to detect a water level in the tub,
wherein the controller is configured to:
detect at least one of a value of current applied to the driving part, a value of revolutions per minute (RPM) of the drum, or a value of the water level, and
based on at least one of the detected values, determine the course or the option through the artificial intelligence.

6. The laundry treating apparatus of claim 1, further comprising:
a cabinet that defines an exterior of the laundry treating apparatus;
a tub accommodated in the cabinet and configured to receive water; and
a drum rotatably arranged in the tub and configured to receive the clothing,
wherein the controller is configured to:
recognize a weight of the clothing or a material of the clothing through the artificial intelligence; and
determine the setting of the course or the option according to the weight of the clothing or the material of the clothing, and
wherein the setting comprises at least one of revolutions per minute (RPM) of the drum, a water level of the water in the tub, a temperature of the water, or an execution time of the course or the option.

7. The laundry treating apparatus of claim 5, wherein the controller is configured to:
recognize a weight of the clothing or a material of the clothing through the artificial intelligence; and
determine a dehydration condition for execution of the course or the option.

8. The laundry treating apparatus of claim 1, further comprising:
an input unit configured to receive a command for changing the determined setting of the course or the option,
wherein the controller is configured to, based on the command being received through the input unit, determine an amount of a change of the determined setting using the artificial intelligence.

9. The laundry treating apparatus of claim 8, further comprising:
a cabinet that defines an exterior of the laundry treating apparatus;
a tub accommodated in the cabinet and configured to receive water;
a drum rotatably arranged in the tub and configured to receive the clothing;
a driving part coupled to the tub and configured to rotate the drum; and
a water level sensor configured to detect a water level in the tub,
wherein the determined setting of the course or the option includes at least one of a number of times of execution of a specific cycle performed in the course or the option, a duration of the course or the option, an RPM of the driving part for the course or the option, or a change in the water level in the tub for the course or the option, and
wherein the controller is configured to determine the amount of the change of the setting using the artificial intelligence based on one input received through the input unit.

10. The laundry treating apparatus of claim 9, wherein the indicator is configured to indicate the amount of the change of the determined setting of the course or the option.

11. The laundry treating apparatus of claim 1, further comprising:
a recommendation requester configured to receive an input for requesting one course among the courses or one option among the options to be recommended,
wherein the controller is configured to, based on the input being received through the recommendation requester, recommend the course among the courses or the option among the options using the artificial intelligence, and
wherein the indicator is configured to indicate the course or the option.

12. The laundry treating apparatus of claim 11, further comprising:
a communication module configured to receive local area information or user information provided by a server,
wherein the controller is configured to, based on the local area information or the user information being received through the communication module, recommend the course or the option based on applying the local area information or the user information in the artificial intelligence.

13. The laundry treating apparatus of claim 12, wherein the local area information comprises at least one of:
weather information including a status of raining and a rainfall probability in an area where the laundry treating apparatus is located;
atmospheric information including a temperature, a humidity, and an air pollution status of the area;
earthquake information about whether an earthquake has occurred in the area;
water quality information about a water quality in the area; or
electricity rate information about electricity cost for time zones in the area.

14. The laundry treating apparatus of claim 13, wherein the controller is configured to change the setting of the option based on the local area information, wherein the setting of the option includes a washing intensity, a number of times of rinsing, a dehydration intensity, an apparatus washing, an operating time, a water temperature, or a steam supply.

15. The laundry treating apparatus of claim 1, wherein the execution algorithm determined by the artificial intelligence includes a neural network that is trained based on a plurality of operation data of the laundry treating apparatus.

16. The laundry treating apparatus of claim 11, wherein the recommendation requester comprises at least one of a switch, a button, a camera, a microphone, or an external device configured to communicate with the controller.

17. The laundry treating apparatus of claim 12, wherein the communication module comprises a transmitter, a receiver, or a transceiver that is configured to wirelessly communicate with an external device.

18. The laundry treating apparatus of claim 1, wherein the light emitter is configured to remain turned on based on the controller having used the artificial intelligence at least once to thereby indicate that the laundry treating apparatus is configured to use the artificial intelligence.

* * * * *